(12) United States Patent
Gu et al.

(10) Patent No.: US 11,016,455 B2
(45) Date of Patent: May 25, 2021

(54) INTEGRATED ENERGY SYSTEM OPERATIONAL OPTIMIZATION METHOD CONSIDERING THERMAL INERTIA OF DISTRICT HEATING NETWORKS AND BUILDINGS

(71) Applicant: SOUTHEAST UNIVERSITY, Jiangsu (CN)

(72) Inventors: Wei Gu, Jiangsu (CN); Shuai Lu, Jiangsu (CN); Guannan Lou, Jiangsu (CN); Jun Wang, Jiangsu (CN); Suyang Zhou, Jiangsu (CN)

(73) Assignee: Southeast University, Jiangsu (CN)

( * ) Notice: Subject to any disclaimer, the term of this patent is extended or adjusted under 35 U.S.C. 154(b) by 102 days.

(21) Appl. No.: 16/477,174

(22) PCT Filed: Jan. 29, 2018

(86) PCT No.: PCT/CN2018/074412
§ 371 (c)(1),
(2) Date: Jul. 10, 2019

(87) PCT Pub. No.: WO2018/130231
PCT Pub. Date: Jul. 19, 2018

(65) Prior Publication Data
US 2019/0369581 A1    Dec. 5, 2019

(30) Foreign Application Priority Data
Jan. 11, 2017 (CN) .......................... 201710019950.2

(51) Int. Cl.
*G05B 19/042* (2006.01)
(52) U.S. Cl.
CPC .... *G05B 19/042* (2013.01); *G05B 2219/2639* (2013.01)

(58) Field of Classification Search
CPC .. G06Q 10/04; G06Q 10/06315; G06Q 50/06; G05B 19/042; G05B 2219/2639; G05B 13/041; G05B 15/02
(Continued)

(56) References Cited

U.S. PATENT DOCUMENTS

| | | | |
|---|---|---|---|
| 9,098,876 B2 * | 8/2015 | Steven | G06Q 30/0611 |
| 2012/0232701 A1 * | 9/2012 | Carty | G05B 15/02 |
| | | | 700/277 |
| 2017/0314800 A1 * | 11/2017 | Bengea | F24F 11/30 |

FOREIGN PATENT DOCUMENTS

| | | | | |
|---|---|---|---|---|
| CN | 103400042 | * | 11/2013 | G06F 19/00 |
| CN | 105807633 | * | 7/2016 | G05B 17/02 |

(Continued)

OTHER PUBLICATIONS

"International Search Report (Form PCT/ISA/210) of PCT/CN2018/074412," dated Apr. 9, 2018, with English translation thereof, pp. 1-7.

*Primary Examiner* — Chun Cao
(74) *Attorney, Agent, or Firm* — JCIPRNET

(57) ABSTRACT

Disclosed is an integrated energy system operational optimization method considering thermal inertia of district heating networks and buildings, comprising the following steps. Step 10: respectively establish a district heating network model considering transmission delay and heat loss and a building model considering thermal storage capacity. Step 20: establish an integrated energy system optimization model consisting of a combined cooling, heat and power system model, the district heating network model and the building model. Step 30: solve the integrated energy system optimization model to obtain an optimal scheduling plan, control outputs of a gas turbine and a gas boiler per hour according to the optimal scheduling plan, and purchase electricity from a power grid and a wind power. According (Continued)

to the method, both the district heating network and buildings are included in a scheduling scope, so that the load adjustment with multiple degrees of freedom can be achieved.

5 Claims, 3 Drawing Sheets

(58) Field of Classification Search
USPC .......................................................... 700/287
See application file for complete search history.

(56) References Cited

FOREIGN PATENT DOCUMENTS

| | | |
|---|---|---|
| CN | 106845701 | 6/2017 |
| EP | 3082010 | 10/2016 |

* cited by examiner

INTEGRATED ENERGY SYSTEM OPERATIONAL OPTIMIZATION METHOD CONSIDERING THERMAL INERTIA OF DISTRICT HEATING NETWORKS AND BUILDINGS

CROSS-REFERENCE TO RELATED APPLICATION

This application is a 371 of international application of PCT application serial no. PCT/CN2018/074412, filed on Jan. 29, 2018, which claims the priority benefit of China application no. 201710019950.2, filed on Jan. 11, 2017. The entirety of each of the above mentioned patent applications is hereby incorporated by reference herein and made a part of this specification

TECHNICAL FIELD

The present invention belongs to the field of combined heat and power scheduling of integrated district energy systems, and more particularly, relates to an integrated energy system operational optimization method considering thermal inertia of district heating networks and buildings.

BACKGROUND

In recent years, wind power, as a renewable energy, has developed rapidly due to the mature technology, good economic performance, and high energy efficiency. By the end of 2015, the total installed capacity of wind power in the world reaches 423 GW, and the newly added installed capacity is 63 GW, wherein China accounts for 30.5 GW. The wind power in China is mainly developed in the three northern regions, which are rich in wind power resources and have great demand for heat load in winter. However, with the rapid development of the wind power, the wind power absorption is limited due to the strong coupling relationship between heat output and power output of the combined heat and power units. About 70% of the heat load is supplied by centralized combined heat and power (CHP) units in Jilin. The combined heat and power unit is generally operated in a mode of "thermal load following" in winter. This operation mode greatly limits the power output of the CHP unit. The heat load is high and the power load is low during the nighttime, so that the power supply exceeds the demand which causes serious wind abandonment during this period. According to the data from the National Energy Administration, in the first half of 2016, the national average wind power utilization hours are 917 h, the abandoned wind volume is 323 TWh, and the average wind power absorption rate is 21%. In short, the wind power absorption has become a key problem for the sustainable development of the wind power industry. In order to solve the problem of wind power absorption, electric power personnel have conducted a lot of researches, such as battery, electric boiler, etc. Considering the temporal and spatial relationship between the wind power and the heat load, that is, the regions and periods that have much wind power resources are generally the regions and periods with large demand for heat load, from the perspective of overall energy consumption, the district heating system can be used to provide more space for the wind power absorption.

SUMMARY

Technical Problem

The technical problem to be solved by the present invention is to provide an integrated energy system operational optimization method considering thermal inertia of district heating networks and buildings. The method not only can utilize the transmission delay of the district heating system to coordinate the heat supply and demand balance, but also can utilize the thermal storage capacity of buildings to change heat load temporal distribution, thus improving an operational flexibility of a combined heat and power system, effectively improving a problem of wind power abandonment, and improving an overall economy of the system.

Technical Solution

In order to solve the technical problem above, the embodiments of the present invention provide an integrated energy system operational optimization method considering thermal inertia of district heating networks and buildings, and the method comprises the following steps of:

step 10) respectively establishing a district heating network model considering transmission delay and heat loss and a building model considering thermal storage capacity;

step 20) establishing an integrated energy system optimization model consisting of a combined cooling, heat and power system model, the district heating network model, and the building model; and step 30) solving the integrated energy system optimization model to obtain an optimal scheduling plan, controlling outputs of a gas turbine and a gas boiler per hour according to the optimal scheduling plan, and purchasing electricity from a power grid and a wind power.

As a preferred embodiment, the establishing a district heating network model in the step 10) comprises:

step 101) establishing a district heating network pipeline model, which specifically comprises steps 1011) to 1015):

step 1011) establishing a nodal flow equilibrium equation, as shown in Equations (1) and (2):

$$\sum_{k \in S^e_{ps,i}} q_{ps,k,t} = \sum_{k \in S^s_{ps,i}} q_{ps,k,t} \quad \forall\, i \in S_{ns},\, t \in S_t \qquad \text{Equation (1)}$$

$$\sum_{k \in S^e_{pr,i}} q_{pr,k,t} = \sum_{k \in S^s_{pr,i}} q_{pr,k,t} \quad \forall\, i \in S_{nr},\, t \in S_t \qquad \text{Equation (2)}$$

wherein $q_{ps,k,t}$ represents a water flow of a supply pipeline k at a time t in unit of kg/h; $q_{pr,k,t}$ represents a water flow of a return pipeline k at the time t in unit of kg/h; $S^e_{ps,i}$ represents a set of supply pipelines ended at a node i; $S^e_{pr,i}$ represents a set of return pipelines ended at the node i, $S^s_{ps,i}$, $S^e_{ps,i}$ represents a set of supply pipelines started at the node i, $S^s_{pr,i}$ represents a set of return pipelines started at the node i, $S_{ns}$ represents a set of supply pipeline nodes, $S_{nr}$ represents a set of return pipeline nodes, and $S_t$ represents a set of scheduling time periods;

step 1012) establishing a pipeline pressure loss equation, as shown in Equations (3) to (5):

$$\Delta p_{ps,k,t} = \mu_p \cdot q^2_{ps,k,t} \quad \forall\, k \in S_{ps},\, t \in S_t \qquad \text{Equation (3)}$$

$$\Delta p_{pr,k,t} = \mu_p \cdot q^2_{pr,k,t} \quad \forall\, k \in S_{pr},\, t \in S_t \qquad \text{Equation (4)}$$

$$\sum_{k \in S_{ps}} \Delta p_{ps,k,t} + \sum_{k \in S_{pr}} \Delta p_{ps,k,t} = \sum_{i \in S_{pu}} \Delta p_{pu,i,t} \quad \forall\, t \in S_t \qquad \text{Equation (5)}$$

wherein $\Delta p_{ps,k,t}$ represents a pressure loss of the supply pipeline k at the time t in unit of m; $\mu_p$ represents a pressure loss factor, $S_{ps}$ represents a set of supply pipelines, $\Delta p_{pr,k,t}$ represents a pressure loss of the return pipeline k at the time t in unit of m; $S_{pr}$ represents a set of return pipelines, $\Delta p_{pu,i,t}$ represents a pressure provided by a water pump i at the time t, and $S_{pu}$ represents a set of water pumps in a pipeline;

step 1013) establishing a temperature-flow-heat equation, as shown in Equations (6) and (7):

$$Q_{ps,k,t}^{in} = q_{ps,k,t} \cdot T_{ps,k,t}^{in} / \lambda \forall t \in S_t, k \in S_{ps}$$

$$Q_{ps,k,t}^{out} = q_{ps,k,t} \cdot T_{ps,k,t}^{out} / \lambda \forall t \in S_t, k \in S_{ps} \quad \text{Equation (6)}$$

$$Q_{pr,k,t}^{in} = q_{pr,k,t} \cdot T_{pr,k,t}^{in} / \lambda \forall t \in S_t, k \in S_p$$

$$Q_{pr,k,t}^{out} = q_{pr,k,t} \cdot T_{pr,k,t}^{out} / \lambda \forall t \in S_t, k \in S_p \quad \text{Equation (7)}$$

wherein $Q_{ps,k,t}^{in}$ represents an inlet heat power of the supply pipeline k at the time t in unit of kW; C represents a specific heat capacity of water; $T_{ps,k,t}^{in}$ represents an inlet temperature of the supply pipeline k at the time t in unit of ° C.; $\lambda$ represents a unit conversion factor; $Q_{ps,k,t}^{out}$ represents an outlet heat power of the supply pipeline k at the time t in unit of kW; $T_{ps,k,t}^{out}$ represents an outlet temperature of the supply pipeline k at the time t in unit of ° C.; $Q_{pr,k,t}^{in}$ represents an inlet heat power of the return pipeline k at the time t in unit of kW; $T_{pr,k,t}^{in}$ represents an inlet temperature of the return pipeline k at the time t in unit of ° C.; $Q_{pr,k,t}^{out}$ represents an outlet heat power of the return pipeline k at the time t in unit of kW; and $T_{pr,k,t}^{out}$ represents an outlet temperature of the return pipeline k at the time t in unit of ° C.;

step 1014) establishing a temperature fusion equation: according to the first law of thermodynamics, if the water flow of each pipeline ended at the node i forms a stable temperature field after fusion at the node i, then inlet temperatures of the pipelines started at the node i are all equal and equal to a node temperature, as shown in Equations (8) to (11):

$$\sum_{k \in S_{ps,i}^e} T_{ps,k,t}^{out} \cdot q_{ps,k,t} = T_{ns,i,t} \cdot \sum_{k \in S_{ps,i}^e} q_{ps,k,t} \quad \text{Equation (8)}$$

$$\forall i \in S_{ns}, t \in S_t$$

$$\sum_{k \in S_{pr,i}^e} T_{pr,k,t}^{out} \cdot q_{pr,k,t} = T_{nr,i,t} \cdot \sum_{k \in S_{pr,i}^e} q_{pr,k,t} \quad \text{Equation (9)}$$

$$\forall i \in S_{nr}, t \in S_t$$

$$T_{ns,i,t} = T_{ps,k,t}^{in} \quad \forall i \in S_{ns}, t \in S_t, k \in S_{ps,i}^s \quad \text{Equation (10)}$$

$$T_{nr,i,t} = T_{pr,k,t}^{in} \quad \forall i \in S_{nr}, t \in S_t, k \in S_{pr,i}^s \quad \text{Equation (11)}$$

wherein $T_{ns,i,t}$ represents a temperature of the node i of the supply pipeline at the time t in unit of ° C.; $T_{nr,i,t}$ and represents a temperature of the node i of the return pipeline at the time t in unit of ° C.; and step 1015) establishing a district heating network transmission delay equation:

calculating a water flow rate of hot water in the pipeline, as shown in Equations (12) and (13):

$$v_{ps,k,t} = \frac{q_{ps,k,t}}{\rho \pi (d_k/2)^2} / \lambda \; \forall k \in S_{ps}, t \in S_t \quad \text{Equation (12)}$$

$$v_{pr,k,t} = \frac{q_{pr,k,t}}{\rho \pi (d_k/2)^2} / \lambda \; \forall k \in S_{pr}, t \in S_t \quad \text{Equation (13)}$$

wherein $v_{ps,k,t}$ represents a water flow rate of hot water in the supply pipeline k at the time t in unit of m/s; $\rho$ represents a density of hot water; $d_k$ represents an inner diameter of the pipeline k in unit of m; and $v_{pr,k,t}$ represents a water flow rate of hot water in the return pipeline k at the time t in unit of m/s;

constraint conditions of the water flow rate of the hot water satisfying Equations (14) and (15):

$$v_{ps,k,t}^{min} \leq v_{ps,k,t} \leq v_{ps,k,t}^{max} \forall k \in S_{ps}, t \in S_t \quad \text{Equation (14)}$$

$$v_{pr,k,t}^{min} \leq v_{pr,k,t} \leq v_{pr,k,t}^{max} \forall k \in S_{pr}, t \in S_t \quad \text{Equation (15)}$$

wherein $v_{ps,k,t}^{min}$ represents a lower limit of the water flow rate of the hot water in the supply pipeline k at the time t in unit of m/s; $v_{ps,k,t}$ represents the water flow rate of the hot water in the supply pipeline k at the time t in unit of m/s; $v_{ps,k,t}^{max}$ represents an upper limit of the water flow rate of the hot water in the supply pipeline k at the time t in unit of m/s; $v_{pr,k,t}$ represents a lower limit of the water flow rate of the hot water in the return pipeline k at the time t in unit of m/s; $v_{pr,k,t}$ represents the water flow rate of the hot water in the return pipeline k at the time t in unit of m/s; and $v_{pr,k,t}^{max}$ represents an upper limit of the water flow rate of the hot water in the return pipeline k at the time t in unit of m/s;

calculating a transmission time of hot water in the pipeline, as shown in Equations (16) and (17):

$$\tau_{ps,k,t} = \sum_{j \in S_{ps,k}} \frac{l_j}{v_{ps,j,t}} / \lambda \; \forall k \in S_{ps}, t \in S_t \quad \text{Equation (16)}$$

$$\tau_{pr,k,t} = \sum_{j \in S_{pr,k}} \frac{l_j}{v_{pr,j,t}} / \lambda \; \forall k \in S_{pr}, t \in S_t \quad \text{Equation (17)}$$

wherein $\tau_{ps,k,t}$ represents a transmission time of the supply pipeline k at the time t in unit of h; $l_j$ represents a length of a pipeline j in unit of m; $v_{ps,j,t}$ represents a water flow rate of hot water in a supply pipeline j at the time t in unit of m/s; $S_{ps,k}$ represents a set of pipelines of hot water flowing from a heat source to the supply pipeline k; $\tau_{pr,k,t}$ represents a transmission time of the return pipeline k at the time t in unit of h; $S_{pr,k}$ represents a set of pipelines of hot water flowing from the heat source to the return pipeline k; and $v_{pr,j,t}$ represents a water flow rate of hot water in a return pipeline j at the time t in unit of m/s;

rounding actual transmission times calculated by Equations (16) and (17), as shown in Equations (18) and (19):

$$\tau_{ps,k,t}^{sp} = \text{round}(\tau_{ps,k,t}/\Delta t) \forall k \in S_{ps}, t \in S_t \quad \text{Equation (18)}$$

$$\tau_{pr,k,t}^{sp} = \text{round}(\tau_{pr,k,t}/\Delta t) \forall k \in S_{pr}, t \in S_t \quad \text{Equation (19)}$$

wherein $\tau_{ps,k,t}^{sp}$ represents a transmission period of the supply pipeline k at the time t in unit of h; $\tau_{pr,k,t}^{sp}$ represents a transmission time period of the return pipeline k at the time t in unit of h; and $\Delta t$ represents a scheduling time scale in unit of h;

after considering a transmission delay and a transmission heat loss of the heating network, inlet and outlet temperatures of the pipeline satisfying constraints shown in Equations (20) and (21):

$$Q_{ps,k_1,t}^{in} - Q_{ps,k_2,t+\tau_{ps,k_2,t}^{sp}}^{out} = \left(1 - \mu_{in} \sum_{j \in S_{ps,k_2}} l_j\right) \cdot Q_{ps,k_1,t}^{in} \quad \text{Equation (20)}$$

$$\forall t \in S_t, k_1 \in S_{ps,hs}, k_2 \in S_{ps}$$

-continued $$Q_{pr,k_1,t}^{in} - Q_{pr,k_2,t+\tau_{pr,k_2,t}^{sp}}^{out} = \left(1 - \mu_{hm} \sum_{j \in S_{pr,k_2}} l_j\right) \cdot Q_{pr,k_1,t}^{in}$$ Equation (21)

$$\forall t \in S_t, k_1 \in S_{pr,m}, k_2 \in S_{pr}$$

wherein $Q_{ps,k_1,t}^{in}$ represents an inlet heat power of a supply pipeline $k_1$ at the time t in unit of kW;

$$Q_{ps,k_2,t+\tau_{ps,k_2,t}^{sp}}^{out}$$

represents an outlet heat power of a supply pipeline $k_2$ at a time $t+\tau_{ps,k_2,t}^{sp}$ in unit of kW; $\mu_{hm}$ represents a heat loss rate of the heating network; $S_{ps,k_2}$ represents a set of pipelines between the heat source and the supply pipeline $k_2$; $S_{ps,hs}$ represents a set of supply pipelines connected with the heat source; $Q_{pr,k_1,t}^{in}$ represents an inlet heat power of a return pipeline $k_1$ at the time t in unit of kW;

$$Q_{pr,k_2,t+\tau_{pr,k_2,t}^{sp}}^{out}$$

represents an outlet heat power of a return pipeline $k_2$ at a time $t+\tau_{ps,k_2,t}^{sp}$ in unit of kW; $S_{pr,k_2}$ represents a set of pipelines between the heat source and the return pipeline $k_2$; $S_{pr,m}$ represents a set of return pipelines connected with a heat exchanger m; $\tau_{ps,k_2,t}^{sp}$ represents a delay period of hot water flowing from the heat source to the supply pipeline $k_2$ at the time t; $\tau_{pr,k_2,t}^{sp}$ represents a delay period of hot water flowing from the return pipeline $k_2$ to the heat source at the time t; and $l_j$ represents a length of the pipeline j in unit of m; and step 102) establishing a heat exchanger model:
in the heating network, coupling the heat source with a primary heat supply network by a primary heat exchanger, the model being shown in Equations (22) and (23):

$$Q_{ps,k_1,t}^{in} - Q_{pr,k_2,t}^{out} = \eta_{ex,1} \cdot (Q_{gt,t} + Q_{gb,t}) \forall t \in S_t, k_1 \in S_{ps,hs}, k_2 \in S_{pr,hs}$$ Equation (22)

$$q_{ps,k_1,t} = q_{pr,k_2,t} \forall t \in S_t, k_1 \in S_{ps,hs}, k_2 \in S_{pr,hs}$$ Equation (23)

wherein $Q_{ps,k_1,t}^{in}$ represents the inlet heat power of the supply pipeline $k_1$ at the time t in unit of kW; $Q_{pr,k_2,t}^{out}$ represents the outlet heat power of the return pipeline $k_2$ at the time t in unit of kW; $Q_{gt,t}$ represents heat output of the gas turbine at the time t in unit of kW; $Q_{gb,t}$ represents heat output of the gas boiler at the time t in unit of kW; $\eta_{ex,1}$ represents a heat exchange efficiency of the primary heat exchanger; $q_{ps,k_1,t}$ represents a water flow of hot water in a supply pipeline $k_1$ at the time t in unit of kg/h; $q_{pr,k_2,t}$ represents a water flow of hot water in a return pipeline $k_2$ at the time t in unit of kg/h; and $S_{pr,hs}$ represents a set of return pipelines connected with the heat source;

coupling the primary heat supply network with a secondary heat supply network by a secondary heat exchanger, the model being shown in Equations (24) and (25):

$$Q_{ps,k_1,t}^{out} - Q_{pr,k_2,t}^{in} = \sum_{n \in S_{ra,m}} Q_{ra,n,t}/\eta_{ex,2}$$ Equation (24)

$$\forall t \in S_t, k_1 \in S_{ps,m}, k_2 \in S_{pr,m}$$

$$q_{ps,k_1,t} = q_{pr,k_2,t} \ \forall t \in S_t, k_1 \in S_{ps,m}, k_2 \in S_{pr,m}$$ Equation (25)

wherein $Q_{ps,k_1,t}^{out}$ represents the inlet heat power of the supply pipeline $k_1$ at the time t in unit of kW; $Q_{pr,k_2,t}^{in}$ represents the outlet heat power of the return pipeline $k_2$ at the time t in unit of kW; $Q_{ra,n,t}$ represents a heat dissipation power of a user radiator n at the time t in unit of kW; $\eta_{ex,2}$ represents a heat exchange efficiency of the secondary heat exchanger; $S_{ps,m}$ represents a set of supply pipelines connected with a secondary heat exchanger m; and $S_{pr,m}$ represents a set of return pipelines connected with the secondary heat exchanger m.

As a preferred embodiment, $\Delta t=0.5$ h, $\lambda=3600$, $C=4.168$ kJ/(kg·° C.), and $\rho=960$ kg/m$^3$.

As a preferred embodiment, the establishing a building model in the step 10) comprises:

step 111) establishing an indoor temperature change model, as shown in Equations (26) and (27):

$$\begin{cases} T_{n,t+1}^{in} = (T_{n,t}^{out} + Q_{ra,n,t}/\eta_{air}) \cdot (1 - e^{-\Delta t/T_c}) + T_{n,t}^{in} \cdot e^{-\Delta t/T_c} & U_{she,m,t} = 1 \\ T_{n,t+1}^{in} = T_{n,t}^{out} \cdot (1 - e^{-\Delta t/T_c}) + T_{n,t}^{in} \cdot e^{-\Delta t/T_c} & U_{she,m,t} = 0 \end{cases}$$ Equation (26)

$$T_t^{min} \leq T_{n,t}^{in} \leq T_t^{max}$$ Equation (27)

wherein $T_{n,t+1}^{in}$ represents an indoor temperature of a building n at a time t+1 in unit of ° C.; $T_{n,t}^{out}$ represents an outdoor temperature of the building n at a time t in unit of ° C.; $\eta_{air}$ represents a thermal conductivity of air in unit of kW/° C.; $T_c$ represents a scheduling period; $T_{n,t}^{in}$ represents an indoor temperature of the building n at the time t in unit of ° C.; $U_{she,m,t}$ represents a switching state of a secondary heat exchanger m at the time t, i.e., $U_{she,m,t}=1$ represents that the secondary heat exchanger m is switched on at the time t, and $U_{she,m,t}=0$ represents that the secondary heat exchanger m is switched off at the time t; $T_t^{min}$ represents a lower limit of an indoor temperature at the time t in unit of ° C.; and $T_t^{max}$ represents an upper limit of the indoor temperature at the time t in unit of ° C.; and step 112) calculating a heat supply index, as shown in Equations (28) and (29):

$$Q_{res,n,t}^d = K_n^a \cdot A_n \cdot 10^{-3}$$ Equation (28)

$$\sum_t Q_{ra,n,t} = \sum_t Q_{res,n,t}^d$$ Equation (29)

wherein $Q_{res,n,t}^d$ represents a design heat load of the building n at the time t in unit of kW; $K_n^a$ represents an area thermal index of the building n in unit of W/m$^2$; and $A_n$ represents an area of the building n in unit of m$^2$.

As a preferred embodiment, the step 20) comprises:

step 201) establishing an objective function, as shown in Equation (30):

$$\min C_{total} = C_e + C_g + C_{om} + C_{wt}$$ Equation (30)

$$C_e = \sum_t (K_{gd,e,t} \cdot P_{gd,t} + K_{wt,e,t} \cdot P_{wt,t}) \cdot \Delta t$$

-continued $$C_g = \sum_t \frac{K_g}{H_{ng}} \cdot (Q_{gb,t}/\eta_{gb,h} + P_{gt,t}/\eta_{gt,e}) \cdot \Delta t$$

$$C_{om} = \sum_t (K_{gt,om} \cdot P_{gt,t} + K_{gb,om} \cdot Q_{gb,t}) \cdot \Delta t$$

$$C_{wt} = \sum_t \delta \cdot (P_{wt,t}^{pre} - P_{wt,t}) \cdot \Delta t$$

wherein $C_{total}$ represents a total cost for daily operation in unit of ¥ (RMB); $C_e$ represents an electricity purchasing cost for daily operation in unit of ¥; $C_g$ represents a gas purchasing cost for daily operation in unit of ¥; $C_{om}$ represents a maintenance cost for daily operation in unit of ¥; $C_{wt}$ represents a wind power abandonment penalty for daily operation in unit of ¥; $P_{gd,t}$ represents an amount of electricity purchased from the power grid at a time t in unit of kW; $K_{gd,e,t}$ represents an electricity price for purchasing electricity from the power grid at the time t in unit of ¥/kWh; $P_{wt,t}$ represents an amount of electricity purchased from the wind power at the time t in unit of kW; $K_{wt,e,t}$ represents an electricity price for purchasing electricity from the wind power at the time t in unit of ¥/kWh; $\eta_{gb,h}$ represents a heating efficiency of the gas boiler; $P_{gt,t}$ represents an output of the gas turbine at the time t in unit of kW; $\eta_{gt,e}$ represents a power generation efficiency of the gas turbine; $K_g$ represents a unit price of gas in unit of ¥/m³; $H_{ng}$ is a heat value of gas in unit of kWh/m³; $K_{gt,om}$, represents an operation and maintenance cost of the gas turbine in unit of ¥/kWh; $K_{gb,om}$ represents an operation and maintenance cost of the gas boiler in unit of ¥/kWh; $\delta$ represents a wind power penalty cost in unit of ¥/kWh; and $P_{wt,t}^{pre}$ represents a predicted wind power output at the time t in unit of kW; and step 202) establishing constraint conditions, which comprises steps 2021) to 2024):

step 2021) establishing an electric power equilibrium constraint, as shown in Equation (31):

$$P_{gt,t} + P_{gd,t} + P_{wt,t} = \sum_{m \in S_{she}} \sum_{n \in S_{ra,m}} P_{n,t} \quad \text{Equation (31)}$$

wherein $S_{she}$ represents a set of secondary heat exchangers; $S_{ra,m}$ represents a set of user radiators connected with a secondary heat exchanger m; and $P_{n,t}$ represents an electrical load of a building n in unit of kW;

step 2022) establishing a gas turbine operation constraint, as shown in Equations (32) to (34):

$$Q_{gt,t} = (1 - \eta_{gt,e} - \eta_{gt,loss}) \eta_{hr,h}/\eta_{gt,e} \cdot P_{gt,t} \quad \text{Equation (32)}$$

$$P_{gt,t}^{min} \leq P_{gt,t} \leq P_{gt,t}^{max} \quad \text{Equation (33)}$$

$$-P_{gt,dw}^{max} \leq P_{gt,t} - P_{gt,t-1} \leq P_{gt,up}^{max} \quad \text{Equation (34)}$$

wherein $\eta_{gt,loss}$ represents a loss rate of the gas turbine; $\eta_{hr,h}$ represents a recovery efficiency of a heat recover device; $P_{gt,t}^{max}$ represents an upper limit of an operating power of the gas turbine at the time t in unit of kW; $P_{gt,t}^{min}$ represents a lower limit of the operating power of the gas turbine at the time t in unit of kW; $P_{gt,dw}^{max}$ represents an upper limit of a ramping down power of the gas turbine in unit of kW; $P_{gt,up}^{max}$ represents an upper limit of a ramping up power of the gas turbine in unit of kW; and $P_{gt,t-1}$ represents an output of the gas turbine at a time t−1 in unit of kW;

step 2023) establishing a minimum start-stop time constraint: comprising a minimum operation time constraint of the gas turbine shown in Equation (35), a stop time constraint of the gas turbine shown in Equation (36), a minimum operation time constraint of the secondary heat exchanger shown in Equation (37), and a stop time constraint of the secondary heat exchanger shown in Equation (38):

$$\begin{cases} \tau_{gt,t}^{on} = (\tau_{gt,t-1}^{on} + U_{gt,t} \cdot \Delta t) \cdot U_{gt,t} \\ \tau_{gt,t}^{off} = (\tau_{gt,t-1}^{off} + (1 - U_{gt,t}) \cdot \Delta t) \cdot (1 - U_{gt,t}) \end{cases} \quad \text{Equation (35)}$$

$$\begin{cases} \tau_{gt,t}^{on} \geq \tau_{gt}^{on,min} \\ \tau_{gt,t}^{off} \geq \tau_{gt}^{off,min} \end{cases} \quad \text{Equation (36)}$$

$$\begin{cases} \tau_{she,m,t}^{on} = (\tau_{she,m,t-1}^{on} + U_{she,m,t} \cdot \Delta t) \cdot U_{she,m,t} \\ \tau_{she,m,t}^{off} = (\tau_{she,m,t-1}^{off} + (1 - U_{she,m,t}) \cdot \Delta t) \cdot (1 - U_{she,m,t}) \end{cases} \quad \text{Equation (37)}$$

$$\begin{cases} \tau_{she,m,t}^{on} \geq \tau_{she,m}^{on,min} \\ \tau_{she,m,t}^{off} \geq \tau_{she,m}^{off,min} \end{cases} \quad \text{Equation (38)}$$

wherein $\eta_{gt,t}^{on}$ represents a continuous start-up time of the gas turbine at the time t in unit of h; $\eta_{gt,t-1}^{on}$ represents a continuous start-up time of the gas turbine at the time t−1 in unit of h; $U_{gt,t}$ represents an operating state of the gas turbine at the time t, $U_{gt,t}=1$ represents that the gas turbine is operated at the time t, and $U_{gt,t}=0$ represents that the gas turbine is shut down at the time t; $\tau_{gt,t}^{off}$ represents a continuous shutdown time of the gas turbine at the time t in unit of h; $\tau_{gt,t-1}^{off}$ represents a continuous shutdown time of the gas turbine at the time t−1 in unit of h; $\tau_{gt}^{on,min}$ represents a lower limit of the continuous start-up time of the gas turbine in unit of h; $\tau_{gt}^{off,min}$ represents a lower limit of the continuous shutdown time of the gas turbine in unit of h; $\tau_{she,m,t}^{on}$ represents a continuous start-up time of the secondary heat exchanger at the time t in unit of h; $\tau_{she,m,t-1}^{on}$ represents a continuous start-up time of the secondary heat exchanger at the time t−1 in unit of h; $U_{she,m,t}$ represents an on-off state of the secondary heat exchanger m at the time t, $U_{she,m,t}=1$ represents that the secondary heat exchanger m is switched on at the time t, and $U_{she,m,t}=0$ represents that the secondary heat exchanger m is switched off at the time t; $\tau_{she,m,t}^{off}$ represents a continuous stop time of the secondary heat exchanger at the time t in unit of h; $\tau_{she,m,t-1}^{off}$ represents a continuous stop time of the secondary heat exchanger at the time t−1 in unit of h; $\tau_{she,m}^{on,min}$ represents a lower limit of the continuous start-up time of the secondary heat exchanger in unit of h; and $\tau_{she,m}^{off,min}$ represents a lower limit of the continuous stop time of the secondary heat exchanger in unit of h;

step 2024) establishing a tie-line power constraint, as shown in Equation (39):

$$\begin{cases} P_{gd}^{min} \leq P_{gd,t} \leq P_{gd}^{max} \\ 0 \leq P_{wt,t} \leq P_{wt,t}^{pre} \end{cases} \quad \text{Equation (39)}$$

wherein $P_{gd}^{min}$ represents a lower limit of purchasing electricity from the power grid in unit of kW; and $P_{gd}^{max}$ represents an upper limit of purchasing electricity from the power grid in unit of kW.

As a preferred embodiment, in the step 30), heating network parameters are substituted into Equations (12) and (13) to obtain a water flow rate of each pipeline section; the heating network parameters and the obtained water flow rates are substituted into Equations (16) and (17) to obtain a specific delay of each pipeline section; the specific delay is substituted into Equations (18) and (19) to obtain a delay period of each pipeline section; finally, the delay period of each pipeline section, the heating network parameters and system parameters are substituted into an integrated energy system optimization model to obtain the optimal scheduling plan; the outputs of the gas turbine and the gas boiler are controlled according to the optimal scheduling plan, and the electricity is purchased from the power grid and the wind power.

Beneficial Effects

Compared with the prior art, the embodiments of the present invention have the following advantages: according to the integrated energy system optimization method considering the thermal inertia of the district heating network and buildings provided by the embodiments of the present invention, a complete district heating network model is firstly established, comprising the nodal flow equilibrium, the pressure loss equation, the node temperature fusion equation, the transmission delay equation, and other operation constraints. Secondly, it is more practical to take the buildings as a thermal energy storage unit, and it is not necessary to additionally install thermal energy storage and other equipment, which can effectively improve the economic performance. Finally, a complete operational model involving all parts of source-network-load in the integrated energy system is established. The model can realize multiple-degree-of-freedom scheduling and increase the system operational flexibility. The optimization model can change the output of devices not only by the district heating network but also by the buildings. For example, the demand-side response method is the collaborative optimization of the source and the load. However, the model in this invention is the source-network-load collaborative optimization, and has larger adjustment range and the higher system operational flexibility. The operation optimization model of the integrated energy system can greatly improve the wind power absorption rate and has the better economic performance. In view of the thermal storage properties of the buildings, the heat load distribution can be changed to increase the heat load supply during the daytime when the output of the wind power is small, so as to store the heat in the buildings, and release the heat from the building during the nighttime when the output of the wind power is large, so as to reduce the output of the CHP unit and increase the wind power absorption. In view of the time delay of the district heating network, the heat supply and demand can be balanced in a longer time scale, and the unit output is directly changed without changing the heat load distribution, thus realizing a larger time scale and a larger capacity of output adjustment.

DETAILED DESCRIPTION

In order to make the object, technical solution and advantages of the present invention clearer, the present invention is further described in detail below with reference to the drawings and the embodiments. It should be understood that the detailed embodiments described here are only intended to explain the present invention, rather than to limit the present invention.

Figure 1:
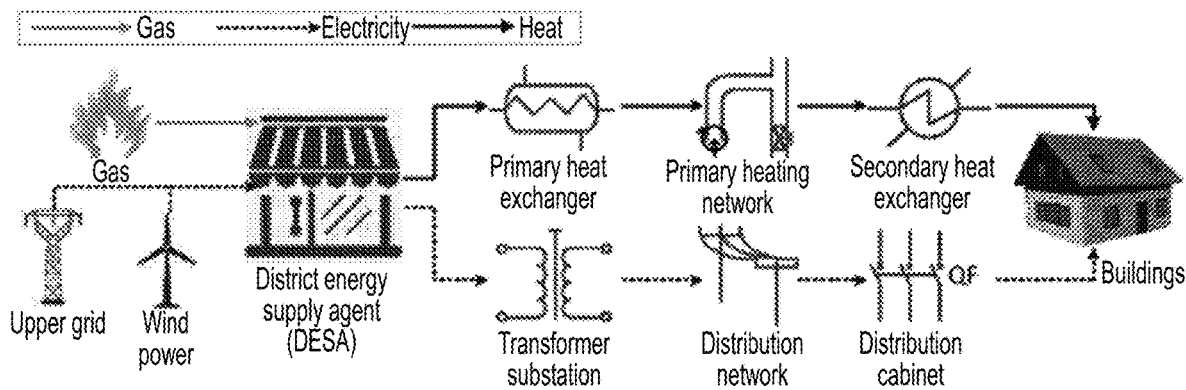
FIG. 1 is a structure diagram of an integrated energy system according to an embodiment of the present invention.

Taking a combined cooling, heat and power system as an example, a structure of an integrated energy system is shown in FIG. 1. It is assumed that a district energy supply agent manages the operation of a CHP unit to satisfy heat and power load of users in the district. Both a heat supply system and a power supply system comprise three parts of source-network-load. The heat energy produced by the CHP is injected into a primary heating network through a primary heat exchanger, and then is injected into each secondary heating network through a secondary heating exchanger, and hot water in the secondary heat exchanger supplies heat to a building through each radiator. Insufficient heat load is supplemented by a gas boiler. Power transmitted by the CHP is injected into a 110 kV power transmission network through a transformer, then is injected into a 10 kV distribution network through a distribution transformer, and is finally delivered to the user. Insufficient power can be supplemented by buying electricity from a main network or a wind power.

An integrated energy system operational optimization method considering thermal inertia of district heating networks and buildings according to an embodiment of the present invention comprises the following steps of:

step 10) respectively establishing a district heating network model considering transmission delay and a building model considering thermal storage capacity;

step 20) establishing an integrated energy system optimization model consisting of a combined cooling, heat and power system model, the district heating network model, and the building model; and step 30) solving the integrated energy system optimization model to obtain an optimal scheduling plan, controlling outputs of a gas turbine and a gas boiler per hour according to the optimal scheduling plan, and purchasing electricity from a power grid and a wind power.

Figure 2:
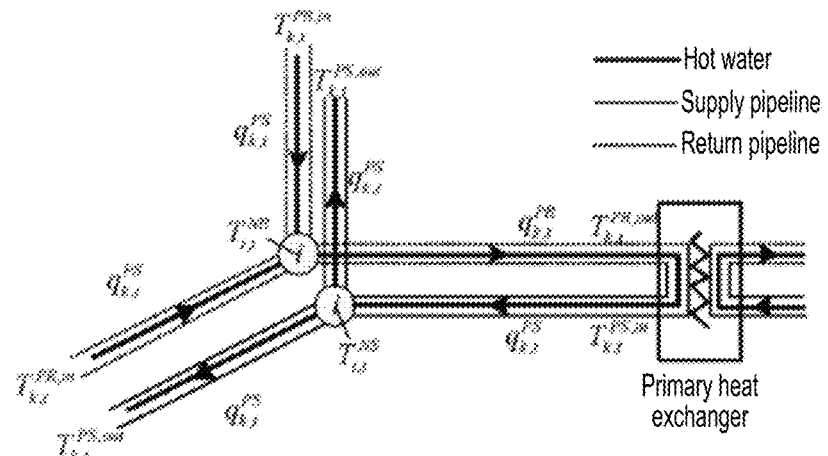
FIG. 2 is a structure diagram of a district heating network according to an embodiment of the present invention.

In the embodiment above, the establishing a district heating network model in the step 10) comprises:

step 101) a district heating network pipeline model is established, which specifically comprises steps 1011) to 1015):

step 1011) a nodal flow equilibrium equation is established: as a structure diagram of a district heating network pipeline shown in FIG. 2, and according to the Kirchhoff's law, a sum of flows to a certain node is equal to a sum of flows out of the node, so that the equilibrium equations shown in Equations (1) and (2) are respectively applied to the water supply and return pipelines:

$$\sum_{k \in S_{ps,i}^e} q_{ps,k,t} = \sum_{k \in S_{ps,i}^s} q_{ps,k,t} \quad \forall\, i \in S_{ns},\, t \in S_t \qquad \text{Equation (1)}$$

Figure 3:
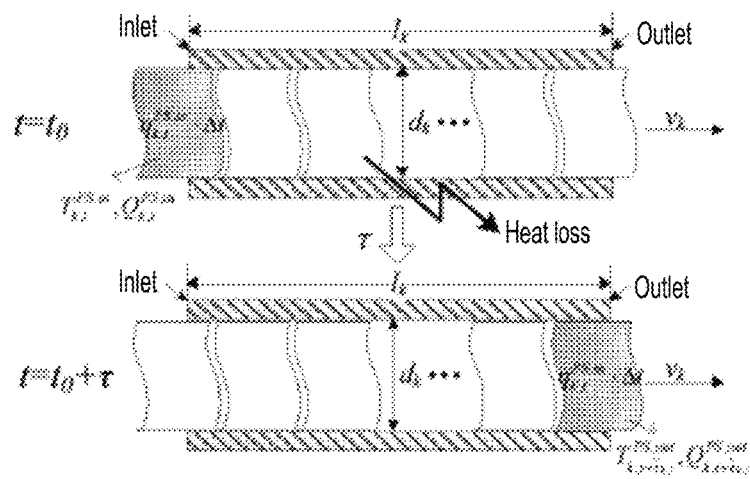
FIG. 3 is a diagram of a district heating network transmission delay according to an embodiment of the present invention.

-continued $$\sum_{k \in S_{pr,i}^e} q_{pr,k,t} = \sum_{k \in S_{pr,i}^s} q_{pr,k,t} \quad \forall i \in S_{nr}, t \in S_t \qquad \text{Equation (2)}$$

wherein $q_{ps,k,t}$ represents a water flow of a supply pipeline k at a time t in unit of kg/h; $q_{pr,k,t}$ represents a water flow of a return pipeline k at the time t in unit of kg/h; $S_{ps,i}^e$ represents a set of supply pipelines ended at a node i; $S_{pr,i}^e$ represents a set of return pipelines ended at the node i, $S_{ps,i}^s$ $S_{ps,i}^e$ represents a set of supply pipelines started at the node i, $S_{pr,i}^s$ represents a set of return pipelines started at the node i, $S_{ns}$ represents a set of supply pipeline nodes, $S_{nr}$ represents a set of return pipeline nodes, and $S_t$ represents a set of scheduling time periods;

step 1012) a pipeline pressure loss equation is established: a pressure loss of a pipeline is proportional to a square of a water flow in the pipeline, as shown in Equations (3) and (4); and according to the Kirchhoff's law, a sum of pipeline pressure drops is equal to a sum of pressures provided by water pumps, as shown in Equation (5):

$$\Delta p_{ps,k,t} = \mu_p \cdot q_{ps,k,t}^2 \quad \forall k \in S_{ps}, t \in S_t \qquad \text{Equation (3)}$$

$$\Delta p_{pr,k,t} = \mu_p \cdot q_{pr,k,t}^2 \quad \forall k \in S_{pr}, t \in S_t \qquad \text{Equation (4)}$$

$$\sum_{k \in S_{ps}} \Delta p_{ps,k,t} + \sum_{k \in S_{pr}} \Delta p_{ps,k,t} = \sum_{i \in S_{pu}} \Delta p_{pu,i,t} \quad \forall t \in S_t \qquad \text{Equation (5)}$$

wherein $\Delta p_{ps,k,t}$ represents a pressure loss of the supply pipeline k at the time t in unit of m; $\mu_p$ represents a pressure loss factor, $S_{ps}$ represents a set of supply pipelines, $\Delta p_{pr,k,t}$ represents a pressure loss of the return pipeline k at the time t in unit of m; $S_{pr}$ represents a set of return pipelines, $\Delta p_{pu,i,t}$ represents a pressure provided by a water pump i at the time t, and $S_{pu}$ represents a set of water pumps in a pipeline;

step 1013) due to heat loss in the heating network, an inlet temperature of a pipeline is different from an outlet temperature of the pipeline. Therefore, a pipeline has two temperature variables, two heat variables and one water flow variable. A temperature-flow-heat equation is established, as shown in Equations (6) and (7):

$$Q_{ps,k,t}^{in} = q_{ps,k,t} \cdot T_{ps,k,t}^{in} / \lambda \forall t \in S_t, k \in S_{ps}$$

$$Q_{ps,k,t}^{out} = q_{ps,k,t} \cdot T_{ps,k,t}^{out} / \lambda \forall t \in S_t, k \in S_{ps} \qquad \text{Equation (6)}$$

$$Q_{pr,k,t}^{in} = q_{pr,k,t} \cdot T_{pr,k,t}^{in} / \lambda \forall t \in S_t, k \in S_p$$

$$Q_{pr,k,t}^{out} = q_{pr,k,t} \cdot T_{pr,k,t}^{out} / \lambda \forall t \in S_t, k \in S_p \qquad \text{Equation (7)}$$

wherein $Q_{ps,k,t}^{in}$ represents an inlet heat power of the supply pipeline k at the time t in unit of kW; C represents a specific heat capacity of water, and preferably, C=4.168 kJ/(kg·° C.); $T_{ps,k,t}^{in}$ represents an inlet temperature of the supply pipeline k at the time t in unit of ° C.; $\lambda$ represents a unit conversion factor, and in the embodiment, $\lambda$ is preferably 3600; $Q_{ps,k,t}^{out}$ represents an outlet heat power of the supply pipeline k at the time t in unit of kW; $T_{ps,k,t}^{out}$ represents an outlet temperature of the supply pipeline k at the time t in unit of ° C.; $Q_{pr,k,t}^{in}$ represents an inlet heat power of the return pipeline k at the time t in unit of kW; $T_{pr,k,t}^{in}$ represents an inlet temperature of the return pipeline k at the time t in unit of ° C.; $Q_{pr,k,t}^{out}$ represents an outlet heat power of the return pipeline k at the time t in unit of kW; and $T_{pr,k,t}^{out}$ represents an outlet temperature of the return pipeline k at the time t in unit of ° C.;

step 1014) a temperature fusion equation is established: as a structure diagram of a district heating network pipeline shown in FIG. 2, and according to the first law of thermodynamics, the heat flowing into a certain node is equal to the heat flowing out of the node. If the water flow of each pipeline ended at the node i forms a stable temperature field after fusion at the node i, then inlet temperatures of the pipelines started at the node i are all equal and equal to a node temperature, as shown in Equations (8) to (11):

$$\sum_{k \in S_{ps,i}^e} T_{ps,k,t}^{out} \cdot q_{ps,k,t} = T_{ns,i,t} \cdot \sum_{k \in S_{ps,i}^e} q_{ps,k,t} \qquad \text{Equation (8)}$$

$$\forall i \in S_{ns}, t \in S_t$$

$$\sum_{k \in S_{pr,i}^e} T_{pr,k,t}^{out} \cdot q_{pr,k,t} = T_{nr,i,t} \cdot \sum_{k \in S_{pr,i}^e} q_{pr,k,t} \qquad \text{Equation (9)}$$

$$\forall i \in S_{nr}, t \in S_t$$

$$T_{ns,i,t} = T_{ps,k,t}^{in} \quad \forall i \in S_{ns}, t \in S_t, k \in S_{ps,i}^s \qquad \text{Equation (10)}$$

$$T_{nr,i,t} = T_{pr,k,t}^{in} \quad \forall i \in S_{nr}, t \in S_t, k \in S_{pr,i}^s \qquad \text{Equation (11)}$$

wherein $T_{ns,i,t}$ represents a temperature of the node i of the supply pipeline at the time t in unit of ° C.; and $T_{nr,i,t}$ represents a temperature of the node i of the return pipeline at the time t in unit of ° C.; and step 1015) a district heating network transmission delay equation is established:

as a diagram of a district heating network transmission delay shown in FIG. 3, a water flow rate of hot water in the pipeline is calculated, and the water flow rate of the hot water in the pipeline is proportional to the water flow of the pipeline, as shown in Equations (12) and (13):

$$v_{ps,k,t} = \frac{q_{ps,k,t}}{\rho \pi (d_k/2)^2} / \lambda \quad \forall k \in S_{ps}, t \in S_t \qquad \text{Equation (12)}$$

$$v_{pr,k,t} = \frac{q_{pr,k,t}}{\rho \pi (d_k/2)^2} / \lambda \quad \forall k \in S_{pr}, t \in S_t \qquad \text{Equation (13)}$$

wherein $v_{ps,k,t}$ represents a water flow rate of hot water in the supply pipeline k at the time t in unit of m/s; $\rho$ represents a density of hot water, and in the embodiment, $\rho$=960 kg/m³; $d_k$ represents an inner diameter of the pipeline k in unit of m; and $v_{pr,k,t}$ represents a water flow rate of hot water in the return pipeline k at the time t in unit of m/s;

if the water flows too fast, the pipeline can be in an unstable hydraulic condition, and if the water flows too slow, a heating effect can be affected. Constraint conditions of the water flow rate of the hot water are established, satisfying Equations (14) and (15):

$$v_{ps,k,t}^{min} \leq v_{ps,k,t} \leq v_{ps,k,t}^{max} \forall k \in S_{ps}, t \in S_t \qquad \text{Equation (14)}$$

$$v_{pr,k,t}^{min} \leq v_{pr,k,t} \leq v_{pr,k,t}^{max} \forall k \in S_{pr}, t \in S_t \qquad \text{Equation (15)}$$

wherein $v_{ps,k,t}^{min}$ represents a lower limit of the water flow rate of the hot water in the supply pipeline k at the time t in unit of m/s; $v_{ps,k,t}$ represents the water flow rate of the hot water in the supply pipeline k at the time t in unit of m/s; $v_{ps,k,t}^{max}$ represents an upper limit of the water flow rate of the hot water in the supply pipeline k at the time t in unit of m/s; $v_{pr,k,t}^{min}$ represents a lower limit of the water flow rate of the hot water in the return pipeline k at the time t in unit of m/s; $v_{pr,k,t}$ represents the water flow rate of the hot water in the return pipeline k at the time t in unit of m/s; and $v_{pr,k,t}^{max}$ represents an upper limit of the water flow rate of the hot water in the return pipeline k at the time t in unit of m/s;

a transmission time of hot water in the pipeline is calculated, as shown in Equations (16) and (17):

$$\tau_{ps,k,t} = \sum_{j \in S_{ps,k}} \frac{l_j}{v_{ps,j,t}} / \lambda \quad \forall k \in S_{ps}, t \in S_t \quad \text{Equation (16)}$$

$$\tau_{pr,k,t} = \sum_{j \in S_{pr,k}} \frac{l_j}{v_{pr,j,t}} / \lambda \quad \forall k \in S_{pr}, t \in S_t \quad \text{Equation (17)}$$

wherein $\tau_{ps,k,t}$ represents a transmission time of the supply pipeline k at the time t in unit of h; $l_j$ represents a length of a pipeline j in unit of m; $v_{ps,j,t}$ represents a water flow rate of hot water in a supply pipeline j at the time t in unit of m/s; $S_{ps,k}$ represents a set of pipelines of hot water flowing from a heat source to the supply pipeline k; $\tau_{pr,k,t}$ represents a transmission time of the return pipeline k at the time t in unit of h; $S_{pr,k}$ represents a set of pipelines of hot water flowing from the heat source to the return pipeline k; and $v_{pr,j,t}$ represents a water flow rate of hot water in a return pipeline j at the time t in unit of m/s;

since actual transmission times are calculated by Equations (16) and (17), and a scheduling command is executed in unit of integer time period in the scheduling optimization model, the actual transmission times calculated by Equations (16) and (17) are rounded, as shown in Equations (18) and (19):

$$\tau_{ps,k,t}^{sp} = \text{round}(\tau_{ps,k,t}/\Delta t) \forall k \in S_{ps}, t \in S_t \quad \text{Equation (18)}$$

$$\tau_{pr,k,t}^{sp} = \text{round}(\tau_{pr,k,t}/\Delta t) \forall k \in S_{pr}, t \in S_t \quad \text{Equation (19)}$$

wherein $\tau_{ps,k,t}^{sp}$ represents a transmission period of the supply pipeline k at the time t in unit of h; $\tau_{pr,k,t}^{sp}$ represents a transmission time period of the return pipeline k at the time t in unit of h; and $\Delta t$ represents a scheduling time scale in unit of h; and preferably, $\Delta t = 0.5$.

Figure 4:
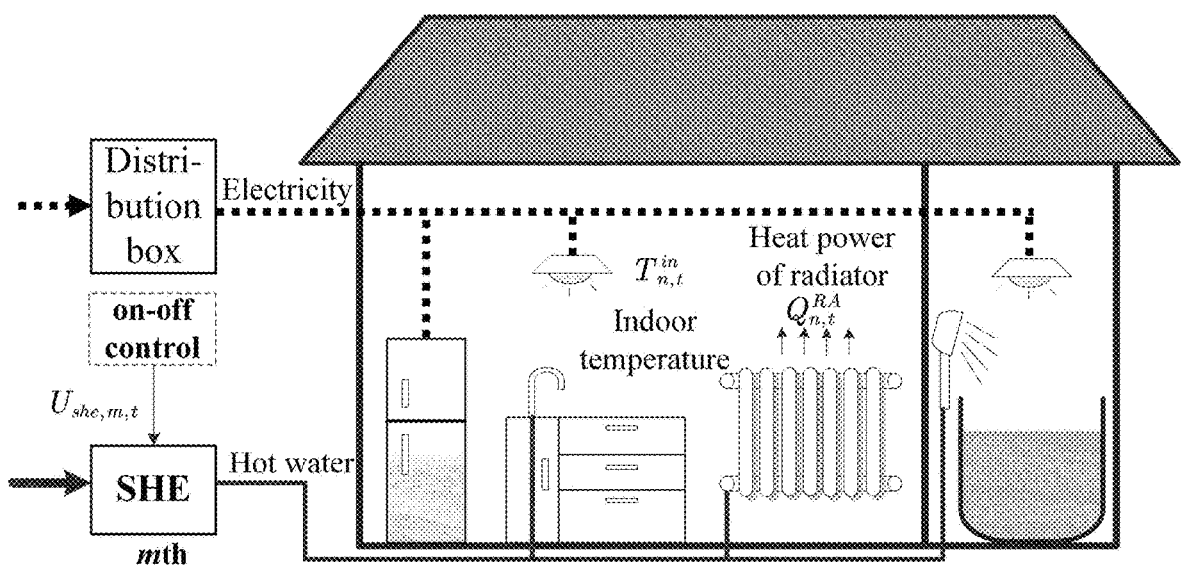
FIG. 4 is a diagram of a building model according to an embodiment of the present invention.

As a diagram of a district heating network transmission delay shown in FIG. 4, after considering a transmission delay and a transmission heat loss of the heating network, inlet and outlet temperatures of the pipeline satisfy constraints shown in Equations (20) and (21):

$$Q_{ps,k_1,t}^{in} - Q_{ps,k_2,t+\tau_{ps,k_2,t}^{sp}}^{out} = \left(1 - \mu_{hm} \sum_{j \in S_{ps,k_2}} l_j\right) \cdot Q_{ps,k_1,t}^{in} \quad \text{Equation (20)}$$

$$\forall t \in S_t, k_1 \in S_{ps,hs}, k_2 \in S_{ps}$$

$$Q_{pr,k_1,t}^{in} - Q_{pr,k_2,t+\tau_{pr,k_2,t}^{sp}}^{out} = \left(1 - \mu_{hm} \sum_{j \in S_{pr,k_2}} l_j\right) \cdot Q_{pr,k_1,t}^{in} \quad \text{Equation (21)}$$

$$\forall t \in S_t, k_1 \in S_{pr,m}, k_2 \in S_{pr}$$

wherein $Q_{ps,k_1,t}^{in}$ represents an inlet heat power of a supply pipeline $k_1$ at the time t in unit of kW;

$$Q_{ps,k_2,t+\tau_{ps,k_2,t}^{sp}}^{out}$$

represents an outlet heat power of a supply pipeline $k_2$ at a time $t+\tau_{ps,k_2,t}^{sp}$ in unit of kW; $\mu_{hm}$ represents a heat loss rate of the heating network; $S_{ps,k_2}$ represents a set of pipelines between the heat source and the supply pipeline $k_2$; $S_{ps,hs}$ represents a set of supply pipelines connected with the heat source; $Q_{pr,k_1,t}^{in}$ represents an inlet heat power of a return pipeline $k_1$ at the time t in unit of kW;

$$Q_{pr,k_2,t+\tau_{pr,k_2,t}^{sp}}^{out}$$

represents an outlet heat power of a return pipeline $k_2$ at a time $t+\tau_{ps,k_2,t}^{sp}$ in unit of kW; $S_{pr,k_2}$ represents a set of pipelines between the heat source and the return pipeline $k_2$; $S_{pr,m}$ represents a set of return pipelines connected with a heat exchanger m; $\tau_{ps,k_2,t}^{sp}$ represents a delay period of hot water flowing from the heat source to the supply pipeline $k_2$ at the time t; $\tau_{pr,k_2,t}^{sp}$ represents a delay period of hot water flowing from the return pipeline $k_2$ to the heat source at the time t; and $l_j$ represents a length of the pipeline j in unit of m; and step 102) a heat exchanger model is established:

in the heating network, the heat generated by the CHP is injected into a primary heat supply network through coupling the heat source with the primary heat supply network by a primary heat exchanger, and the model is shown in Equation (22):

$$Q_{ps,k_1,t}^{in} - Q_{pr,k_2,t}^{out} = \eta_{ex,1} \cdot (Q_{gt,t} + Q_{gb,t}) \forall t \in S_t, k_1 \in S_{ps,hs}, k_2 \in S_{pr,hs} \quad \text{Equation (22)}$$

the water flow equilibrium of the water supply and return pipelines in the primary heat exchanger is ensured, as shown in Equation (23):

$$q_{ps,k_1,t} = q_{pr,k_2,t} \forall t \in S_t, k_1 \in S_{ps,hs}, k_2 \in S_{pr,hs} \quad \text{Equation (23)}$$

wherein $Q_{ps,k_1,t}^{in}$ represents the inlet heat power of the supply pipeline $k_1$ at the time t in unit of kW; $Q_{pr,k_2,t}^{out}$ represents the outlet heat power of the return pipeline $k_2$ at the time t in unit of kW; $Q_{gt,t}$ represents heat output of the gas turbine at the time t in unit of kW; $Q_{gb,t}$ represents heat output of the gas boiler at the time t in unit of kW; $\eta_{ex,1}$ represents a heat exchange efficiency of the primary heat exchanger; $q_{ps,k_1,t}$ represents a water flow of hot water in a supply pipeline $k_1$ at the time t in unit of kg/h; $q_{pr,k_2,t}$ represents a water flow of hot water in a return pipeline $k_2$ at the time t in unit of kg/h; and $S_{pr,hs}$ represents a set of return pipelines connected with the heat source;

the primary heat supply network is coupled with a secondary heat supply network by a secondary heat exchanger, and the model is shown in Equation (24):

$$Q_{ps,k_1,t}^{out} - Q_{pr,k_2,t}^{in} = \sum_{n \in S_{ra,m}} Q_{ra,n,t}/\eta_{ex,2} \quad \text{Equation (24)}$$

$$\forall t \in S_t, k_1 \in S_{ps,m}, k_2 \in S_{pr,m}$$

the water flow equilibrium of the water supply and return pipelines in the secondary heat exchanger is ensured, as shown in Equation (25):

$$q_{ps,k_1,t} = q_{pr,k_2,t} \forall t \in S_t, k_1 \in S_{ps,m}, k_2 \in S_{pr,m} \quad \text{Equation (25)}$$

wherein $Q_{pr,k_1,t}^{out}$ represents the inlet heat power of the supply pipeline $k_1$ at the time t in unit of kW; $Q_{pr,k_2,t}^{in}$ represents the outlet heat power of the return pipeline $k_2$ at the time t in unit of kW; $Q_{ra,n,t}$ represents a heat dissipation power of a user radiator n at the time t in unit of kW; $\eta_{ex,2}$ represents a heat exchange efficiency of the secondary heat exchanger; $S_{ps,m}$ represents a set of supply pipelines connected with a secondary heat exchanger m; and $S_{pr,m}$ represents a set of return pipelines connected with the secondary heat exchanger m.

In the embodiment above, the establishing a building model in the step 10) comprises:

step 111) an indoor temperature change model is established.

Considering that residential heating is a main component of the heat load and has huge adjustable potential, the heat load in the embodiment is the heat load of the residential heating. As a diagram of a building model shown in FIG. 4, the heat load of residents in a small district can be adjusted by adjusting the switching of the secondary heat exchanger. Assuming that $N_m$ users are arranged under the secondary heat exchanger m, an indoor temperature change of a user n can be expressed as Equation (26), and in order to ensure a heating comfort level of residents, the temperature is required to satisfy Equation (27):

Equations (26) and (27) are as follows:

$$\begin{cases} T_{n,t+1}^{in} = (T_{n,t}^{out} + Q_{ra,n,t}/\eta_{air}) \cdot (1 - e^{-\Delta t/T_c}) + T_{n,t}^{in} \cdot e^{-\Delta t/T_c} & U_{she,m,t} = 1 \\ T_{n,t+1}^{in} = T_{n,t}^{out} \cdot (1 - e^{-\Delta t/T_c}) + T_{n,t}^{in} \cdot e^{-\Delta t/T_c} & U_{she,m,t} = 0 \end{cases}$$

Equation (26)

$$T_t^{min} \le T_{n,t}^{in} \le T_t^{max}$$

Equation (27)

wherein $T_{n,t+1}^{in}$ represents an indoor temperature of a building n at a time t+1 in unit of °C.; $T_{n,t}^{out}$ represents an outdoor temperature of the building n at a time t in unit of °C.; $\eta_{air}$ represents a thermal conductivity of air in unit of kW/°C.; $T_c$ represents a scheduling period, and preferably, $T_c=24$ h; $T_{n,t}^{in}$ represents an indoor temperature of the building n at the time t in unit of t; $U_{she,m,t}$ represents a switching state of a secondary heat exchanger m at the time t, i.e., $U_{she,m,t}=1$ represents that the secondary heat exchanger m is switched on at the time t, and $U_{she,m,t}=0$ represents that the secondary heat exchanger m is switched off at the time t; $T_t^{min}$ represents a lower limit of an indoor temperature at the time t in unit of °C.; and $T_t^{max}$ represents an upper limit of the indoor temperature at the time t in unit of °C.; and step 112) a heat supply index is calculated: Equation (28) is an algorithm of an area thermal index of a design heat load of residential heating; in order to ensure a residential heating quality, the total heat supply is required to be equal to the total design heat load while adjusting the heat load of residents, as shown in Equation (29):

Equations (28) and (29) are as follows:

$$Q_{res,n,t}^d = K_n^a \cdot A_n \cdot 10^{-3}$$

Equation (28)

$$\sum_t Q_{ra,n,t} = \sum_t Q_{res,n,t}^d$$

Equation (29)

wherein $Q_{res,n,t}^d$ represents a design heat load of the building n at the time t in unit of kW; $K_n^a$ represents an area thermal index of the building n in unit of W/m²; and $A_n$ represents an area of the building n in unit of m².

Figure 5:
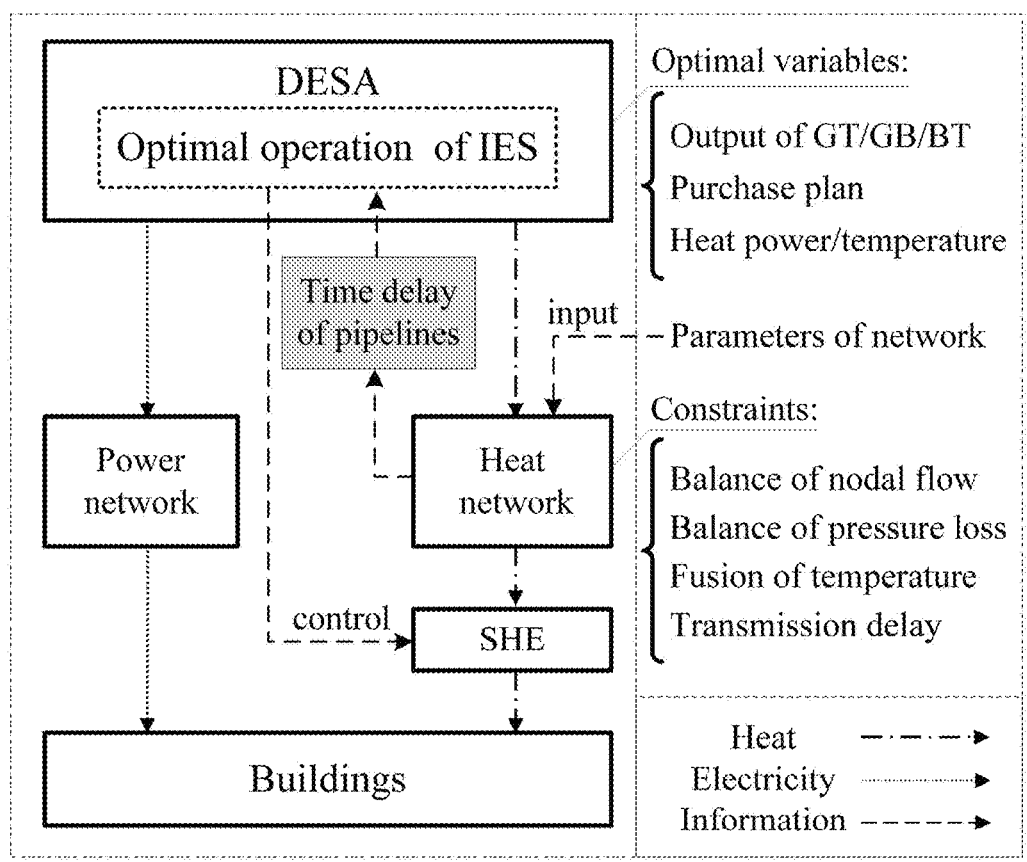
FIG. 5 is a structure diagram of a model according to an embodiment of the present invention.

In the embodiment above, the step 20) comprises the following steps. As a structure diagram of an optimization model shown in FIG. 5, a district energy supply agent establishes an optimization model to solve a day-ahead scheduling plan of the unit and a power supply plan to achieve optimal economy. Since a transmission delay variable in the district heating network model above is a time-related variable and needs to be superimposed with a time variable, the transmission delay variable cannot be solved by general commercial optimization software, and it is considered that in actual district heating network operation, a quality adjustment mode is generally adopted, i.e., a temperature of the hot water is adjusted to ensure a fixed flow, and the fixed water flow is generally a design flow. Therefore, when the design water flow of the pipeline is determined, the transmission delay of each section of the pipeline is also determined, which can be used as a parameter input model, and the model can be solved by the general commercial software. The design water flow of the pipeline can be known by inquiring a design code (GB50019-2003) for a heating and ventilation air conditioner.

In step 201), an objective function is established, and the optimization model aims at economy, comprising an electricity purchasing cost, an operation and maintenance cost, a gas purchasing cost and a wind power abandonment penalty, as shown in Equation (30):

$$\min C_{total} = C_e + C_g + C_{om} + C_{wt}$$

Equation (30)

$$C_e = \sum_t (K_{gd,e,t} \cdot P_{gd,t} + K_{wt,e,t} \cdot P_{wt,t}) \cdot \Delta t$$

$$C_g = \sum_t \frac{K_g}{H_{ng}} \cdot (Q_{gb,t}/\eta_{gb,h} + P_{gt,t}/\eta_{gt,e}) \cdot \Delta t$$

$$C_{om} = \sum_t (K_{gt,om} \cdot P_{gt,t} + K_{gb,om} \cdot Q_{gb,t}) \cdot \Delta t$$

$$C_{wt} = \sum_t \delta \cdot (P_{wt,t}^{pre} - P_{wt,t}) \cdot \Delta t$$

wherein $C_{total}$ represents a total cost for daily operation in unit of ¥; $C_e$ represents an electricity purchasing cost for daily operation in unit of ¥; $C_g$ represents a gas purchasing cost for daily operation in unit of ¥; $C_{om}$ represents a maintenance cost for daily operation in unit of ¥; $C_{wt}$ represents a wind power abandonment penalty for daily operation in unit of ¥; $P_{gd,t}$ represents an amount of electricity purchased from the power grid at a time t in unit of kW; $K_{gd,e,t}$ represents an electricity price for purchasing electricity from the power grid at the time t in unit of ¥/kWh; $P_{wt,t}$ represents an amount of electricity purchased from the wind power at the time t in unit of kW; $K_{wt,e,t}$ represents an electricity price for purchasing electricity from the wind power at the time t in unit of ¥/kWh; $\eta_{gb,h}$ represents a heating efficiency of the gas boiler; $P_{gt,t}$ represents an output of the gas turbine at the time t in unit of kW; $\eta_{gt,e}$ represents a power generation efficiency of the gas turbine; $K_g$ represents a unit price of gas in unit of ¥/m³; $H_{ng}$ is a heat value of gas in unit of kWh/m³; $K_{gt,om}$ represents an operation and maintenance cost of the gas turbine in unit of ¥/kWh; $K_{gb,om}$ represents an operation and maintenance cost of the gas boiler in unit of ¥/kWh; δ represents a wind power penalty cost in unit of ¥/kWh; and $P_{wt,t}^{pre}$ represents a predicted wind power output at the time t in unit of kW.

In step 202), constraint conditions are established, which comprises steps 2021) to 2024).

In step 2021), an electric power equilibrium constraint is established, as shown in Equation (31):

$$P_{gt,t} + P_{gd,t} + P_{wt,t} = \sum_{m \in S_{she}} \sum_{n \in S_{ra,m}} P_{n,t}$$

Equation (31)

wherein $S_{she}$ represents a set of secondary heat exchangers; $S_{ra,m}$ represents a set of user radiators connected with a secondary heat exchanger m; and $P_{n,t}$ represents an electrical load of a building n in unit of kW;

step 2022) a gas turbine operation constraint is established, as shown in Equations (32) to (34):

$$Q_{gt,t} = (1 - \eta_{gt,e} - \eta_{gt,loss})\eta_{hr,h} / \eta_{gt,e} \cdot P_{gt,t} \qquad \text{Equation (32)}$$

$$P_{gt,t}^{min} \leq P_{gt,t} \leq P_{gt,t}^{max} \qquad \text{Equation (33)}$$

wherein $\eta_{gt,loss}$ represents a loss rate of the gas turbine; $\eta_{hr,h}$ represents a recovery efficiency of a heat recover device; $P_{gt,t}^{max}$ represents an upper limit of an operating power of the gas turbine at the time t in unit of kW; $P_{gt,t}^{min}$ represents a lower limit of the operating power of the gas turbine at the time t in unit of kW; $P_{gt,dw}^{max}$ represents an upper limit of a ramping down power of the gas turbine in unit of kW; $P_{gt,up}^{max}$ represents an upper limit of a ramping up power of the gas turbine in unit of kW; and $P_{gt,t-1}$ represents an output of the gas turbine at a time t−1 in unit of kW.

In step 2023), a minimum start-stop time constraint is established: in order to prevent mechanical loss on the gas turbine and the secondary heat exchanger caused by frequent starting and stopping, it is necessary to limit a minimum operation and a stop time of the gas turbine established, and a minimum operation and a stop time of the secondary heat exchanger, specifically comprising a minimum operation time constraint of the gas turbine shown in Equation (35), a stop time constraint of the gas turbine shown in Equation (36), a minimum operation time constraint of the secondary heat exchanger shown in Equation (37), and a stop time constraint of the secondary heat exchanger shown in Equation (38):

$$\begin{cases} \tau_{gt,t}^{on} = (\tau_{gt,t-1}^{on} + U_{gt,t} \cdot \Delta t) \cdot U_{gt,t} \\ \tau_{gt,t}^{off} = (\tau_{gt,t-1}^{off} + (1 - U_{gt,t}) \cdot \Delta t) \cdot (1 - U_{gt,t}) \end{cases} \qquad \text{Equation (35)}$$

$$\begin{cases} \tau_{gt,t}^{on} \geq \tau_{gt}^{on,min} \\ \tau_{gt,t}^{off} \geq \tau_{gt}^{off,min} \end{cases} \qquad \text{Equation (36)}$$

$$\begin{cases} \tau_{she,m,t}^{on} = (\tau_{she,m,t-1}^{on} + U_{she,m,t} \cdot \Delta t) \cdot U_{she,m,t} \\ \tau_{she,m,t}^{off} = (\tau_{she,m,t-1}^{off} + (1 - U_{she,m,t}) \cdot \Delta t) \cdot (1 - U_{she,m,t}) \end{cases} \qquad \text{Equation (37)}$$

$$\begin{cases} \tau_{she,m,t}^{on} \geq \tau_{she,m}^{on,min} \\ \tau_{she,m,t}^{off} \geq \tau_{she,m}^{off,min} \end{cases} \qquad \text{Equation (38)}$$

wherein $\tau_{gt,t}^{on}$ represents a continuous start-up time of the gas turbine at the time t in unit of h; $\tau_{gt,t-1}^{on}$ represents a continuous start-up time of the gas turbine at the time t−1 in unit of h; $U_{gt,t}$ represents an operating state of the gas turbine at the time t, $U_{gt,t}=1$ represents that the gas turbine is operated at the time t, and $U_{gt,t}=0$ represents that the gas turbine is shut down at the time t; $\tau_{gt,t}^{off}$ represents a continuous shutdown time of the gas turbine at the time t in unit of h; $\tau_{gt,t-1}^{off}$ represents a continuous shutdown time of the gas turbine at the time t−1 in unit of h; $\tau_{gt}^{on,min}$ represents a lower limit of the continuous start-up time of the gas turbine in unit of h; $\tau_{gt}^{off,min}$ represents a lower limit of the continuous shutdown time of the gas turbine in unit of h; $\tau_{she,m,t}^{on}$ represents a continuous start-up time of the secondary heat exchanger at the time t in unit of h; $\tau_{she,m,t-1}^{on}$ represents a continuous start-up time of the secondary heat exchanger at the time t−1 in unit of h; $U_{she,m,t}$ represents an on-off state of the secondary heat exchanger m at the time t, $U_{she,m,t}=1$ represents that the secondary heat exchanger m is switched on at the time t, and $U_{she,m,t}=0$ represents that the secondary heat exchanger m is switched off at the time t; $\tau_{she,m,t}^{off}$ represents a continuous stop time of the secondary heat exchanger at the time t in unit of h; $\tau_{she,m,t-1}^{off}$ represents a continuous stop time of the secondary heat exchanger at the time t−1 in unit of h; $\tau_{she,m}^{on,min}$ represents a lower limit of the continuous start-up time of the secondary heat exchanger in unit of h; and $\tau_{she,m}^{off,min}$ represents a lower limit of the continuous stop time of the secondary heat exchanger in unit of h.

In step 2024), a tie-line power constraint is established, as shown in Equation (39):

$$\begin{cases} P_{gd}^{min} \leq P_{gd,t} \leq P_{gd}^{max} \\ 0 \leq P_{wt,t} \leq P_{wt,t}^{pre} \end{cases} \qquad \text{Equation (39)}$$

wherein $P_{gd}^{min}$ represents a lower limit of purchasing electricity from the power grid in unit of kW; and $P_{gd}^{max}$ represents an upper limit of purchasing electricity from the power grid in unit of kW.

In the embodiment above, in the step 30), heating network parameters are substituted into Equations (12) and (13) to obtain a water flow rate of each pipeline section; the heating network parameters and the obtained water flow rates are substituted into Equations (16) and (17) to obtain a specific delay of each pipeline section; the specific delay is substituted into Equations (18) and (19) to obtain a delay period of each pipeline section; finally, the delay period of each pipeline section, the heating network parameters and system parameters are substituted into an integrated energy system optimization model to obtain the optimal scheduling plan; the outputs of the gas turbine and the gas boiler are controlled according to the optimal scheduling plan, and the electricity is purchased from the power grid and the wind power.

In the embodiment, the objective function and the constraint of the operation optimization model are both linear, so that the optimization operation model of the integrated energy system established according to the embodiment of the present invention is a typical mixed integer linear programming model. In the embodiment, the variables to be optimized comprise a day-ahead output plan of the unit, an electricity purchase plan, a temperature of a district heating network operating pipeline, and a control state of the secondary heat exchanger.

In the embodiment, the district heating network model containing the constraints of the nodal flow equilibrium, the node temperature fusion, the transmission delay, the transmission heat loss and the like is firstly established, and the operation optimization model of the integrated energy system is secondly established by taking a building as a heat storage unit and combining the district heating network model. In the embodiment of the present invention, the heating network and the user are included in scheduling, thermoelectric coupling is utilized, and the wind power absorption is promoted from the perspective of a thermodynamic system, so that the wind power absorption can be greatly improved, and the system operation cost can be effectively reduced. In view of the thermal storage capacity of the building, the heat load distribution is changed to change the output distribution of the CHP unit to realize more wind power absorption during the nighttime; and in the operation optimization model, in view of a district heating network delay, the output of the CHP unit and the heat load of the user are staggered to form a leading supply delay on the time scale, thus improving the wind power absorption and the system operation economy.

Figure 6:
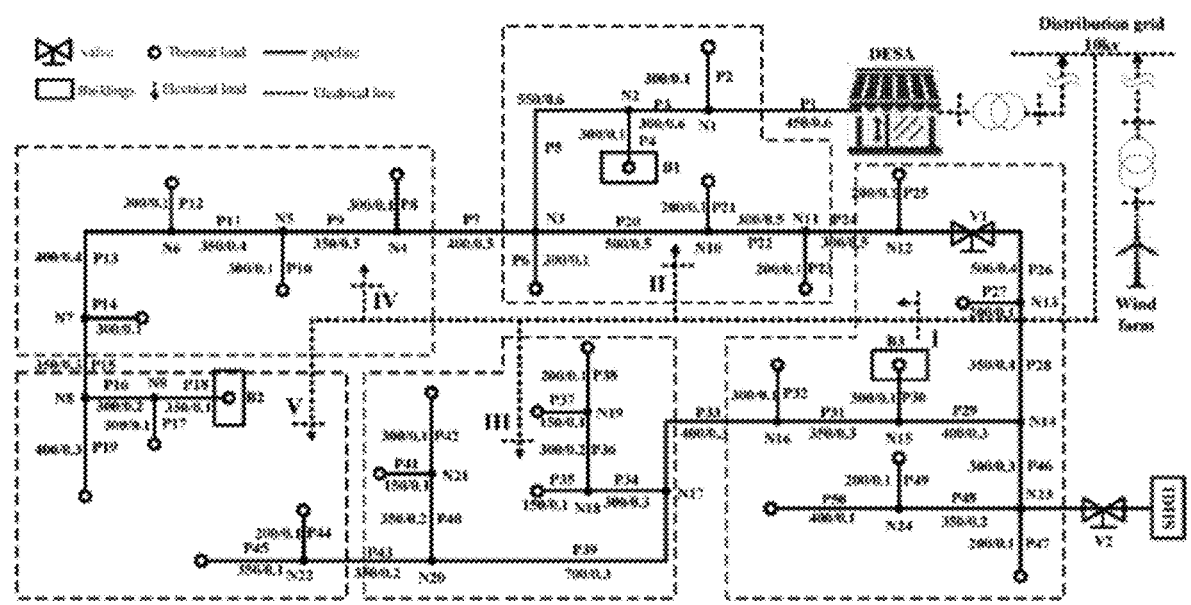
FIG. 6 is a distribution diagram of a primary heat supply network according to an embodiment of the present invention.

An embodiment is illustrated as follows. Taking an actual heating district in Jilin as an example, layout of the primary heating network in the district is shown in FIG. 6, with 50 pipelines, 24 nodes and 26 secondary heat exchangers in total. In addition to the district energy supply agent (DESA), an independent heat source is provided in the district for standby during peak heating, and V1/V2 is a peak-load regulating stop valve. A total installed capacity of wind power in Jilin is 5000 MW, which is absorbed by many districts, and in order to facilitate the research on the wind power absorption capacity of a single district, this case sets a 5 MW virtual wind turbine to be connected through a 10 kV distribution grid. The gas price in this district is 2.3 ¥/m³, the electricity price is 5.25 ¥/kWh, and the wind power penalty is 0.2 ¥/kWh. For the convenience of comparative analysis: Case 1 is set as a basic case, and the transmission delay of the district heating network and the thermal energy storage properties of the buildings are not considered in this case; only the heat storage properties of the house are considered in Case 2; and Case 3 is the model proposed in the embodiment of the present invention. Operational results of the cases are shown in Table 1.

TABLE 1

| Case | Transmission delay of district heating network | Thermal storage of house | Economy (*10^4¥) | | | | | Wind power absorption (MWh) | |
|---|---|---|---|---|---|---|---|---|---|
| | | | Gas | Electricity purchasing | Maintenance | Wind abandonment | Total costs | Absorption amount | Absorption rate |
| 1 | x | x | 11.20 | 1.60 | 1.73 | 1.13 | 15.66 | 30.51 | 51.6% |
| 2 | x | ✓ | 10.87 | 2.67 | 1.40 | 0.33 | 15.27 | 51.40 | 86.9% |
| 3 | ✓ | ✓ | 9.87 | 2.93 | 1.33 | 0.07 | 14.20 | 56.93 | 96.2% |

1) Economy Analysis

It can be seen in Table 1 that the daily operation cost of Case 2 is saved by ¥ 3900 compared with Case 1, with a saving rate of 2.5%. In Case 2, the thermal storage of buildings is considered, i.e., a thermal storage device is introduced. By readjusting the heat load distribution, more wind power is absorbed, which increases the electricity purchasing cost, but simultaneously reduces the wind abandonment penalty. In addition, due to the introduction of the thermal storage device, the output is increased during the daytime when the power load is high, and the heat is stored in the buildings, while the output is reduced during the nighttime when the power load is low, and the heat stored in the buildings is released, so that the unit output is optimized, the gas and operational maintenance costs are reduced, and the economy is improved. In Case 3, the daily operation cost is saved by ¥ 10700, with a saving rate of 7.0% compared with Case 2, and is saved by ¥14600, with a saving rate of 9.3%, compared with Case 1. Thus, it can be seen that, considering the transmission delay of the district heating network, a larger space can be provided for the wind power absorption.

2) Wind Power Absorption Analysis

A wind power absorption amount is 30.51 MWh in Case 1, with an absorption rate of 51.6%. A wind power absorption amount is 51.04 MWh in Case 2, with a wind power absorption rate increased by 35.3% compared with Case 1. A wind power absorption amount is 56.93 MWh in Case 3, with an absorption rate of 96.2%, which is increased by 44.6% compared with Case 1 and is increased by 9.3% compared with Case 2. During the daytime (07:00-21:00), the power load is high but the heat load is low, and a fan output is low, and the wind power during this period can be absorbed in the three cases. During the nighttime (21:00-24:00) and the early morning (00:00-07:00), the power load is low and the fan output is large, so that serious wind power abandonment occurs during this period in Case 1; and in Case 2, due to the consideration of the heat storage properties of the building and the district heating network delay, the wind power absorption during this period is greatly improved. The foregoing is merely the preferred embodiments of the present invention, and it should be noted that those of ordinary skills in the art may further make a plurality of improvements and decorations without departing from the principle of the present invention, and these improvements and decorations shall also fall within the protection scope of the present invention.

The invention claimed is:

1. An integrated energy system operational optimization method considering thermal inertia of district heating networks and buildings, the integrated energy system comprises a heat supply system and a power supply system, the method comprising the following steps:

step 10: respectively establishing a district heating network model considering transmission delay and heat loss and a building model considering thermal storage capacity;

step 20: establishing an integrated energy system optimization model consisting of a combined cooling, heat and power system model, the district heating network model, and the building model; and step 30: solving the integrated energy system optimization model to obtain an optimal scheduling plan for operating the integrated energy system, controlling outputs of a gas turbine and a gas boiler of the heat supply system per hour according to the optimal scheduling plan, and purchasing electricity from a power grid and a wind power, for the power supply system according to the optimal scheduling plan, wherein the establishing a district heating network model in the step 10 comprises:

step 101: establishing a district heating network pipeline model, which specifically comprises steps 1011 to 1015:

step 1011: establishing a nodal flow equilibrium equation, as shown in Equations (1) and (2):

$$\sum_{k \in S_{ps,i}^e} q_{ps,k,t} = \sum_{k \in S_{ps,i}^s} q_{ps,k,t} \quad \forall i \in S_{ns}, t \in S_t \quad \text{Equation (1)}$$

-continued $$\sum_{k \in S_{pr,i}^e} q_{pr,k,t} = \sum_{k \in S_{pr,i}^s} q_{pr,k,t} \quad \forall\, i \in S_{nr}, t \in S_t \quad \text{Equation (2)}$$

wherein $q_{ps,k,t}$ represents a water flow of a supply pipeline k at a time t in unit of kg/h; $q_{pr,k,t}$ represents a water flow of a return pipeline k at the time t in unit of kg/h; $S_{ps,i}^e$ represents a set of supply pipelines ended at a node i; $S_{pr,i}^e$ represents a set of return pipelines ended at the node i, $S_{ps,i}^s S_{ps,i}$ represents a set of supply pipelines started at the node i, $S_{pr,i}^s$ represents a set of return pipelines started at the node i, $S_{ns}$ represents a set of supply pipeline nodes, $S_{nr}$ represents a set of return pipeline nodes, and $S_t$ represents a set of scheduling time periods;

step 1012: establishing a pipeline pressure loss equation, as shown in Equations (3) to (5):

$$\Delta p_{ps,k,t} = \mu_p \cdot q_{ps,k,t}^2 \quad \forall\, k \in S_{ps}, t \in S_t \quad \text{Equation (3)}$$

$$\Delta p_{pr,k,t} = \mu_p \cdot q_{pr,k,t}^2 \quad \forall\, k \in S_{pr}, t \in S_t \quad \text{Equation (4)}$$

$$\sum_{k \in S_{ps}} \Delta p_{ps,k,t} + \sum_{k \in S_{pr}} \Delta p_{ps,k,t} = \sum_{i \in S_{pu}} \Delta p_{pu,i,t} \quad \forall\, t \in S_t \quad \text{Equation (5)}$$

wherein $\Delta p_{ps,k,t}$ represents a pressure loss of the supply pipeline k at the time t in unit of m; $\mu_p$ represents a pressure loss factor, $S_{ps}$ represents a set of supply pipelines, $\Delta p_{pr,k,t}$ represents a pressure loss of the return pipeline k at the time t in unit of m; $S_{pr}$ represents a set of return pipelines, $\Delta p_{pu,i,t}$ represents a pressure provided by a water pump i at the time t, and $S_{pu}$ represents a set of water pumps in a pipeline;

step 1013: establishing a temperature-flow-heat equation, as shown in Equations (6) and (7);

$$Q_{ps,k,t}^{in} = q_{ps,k,t} \cdot T_{ps,k,t}^{in} / \lambda \quad \forall\, t \in S_t, k \in S_{ps}$$

$$Q_{ps,k,t}^{out} = q_{ps,k,t} \cdot T_{ps,k,t}^{out} / \lambda \quad \forall\, t \in S_t, k \in S_{ps} \quad \text{Equation (6)}$$

$$Q_{pr,k,t}^{in} = q_{pr,k,t} \cdot T_{pr,k,t}^{in} / \lambda \quad \forall\, t \in S_t, k \in S_p$$

$$Q_{pr,k,t}^{out} = q_{pr,k,t} \cdot T_{pr,k,t}^{out} / \lambda \quad \forall\, t \in S_t, k \in S_p \quad \text{Equation (7)}$$

wherein $Q_{ps,k,t}^{in}$ represents an inlet heat power of the supply pipeline k at the time t in unit of kW; C represents a specific heat capacity of water; $T_{ps,k,t}^{in}$ represents an inlet temperature of the supply pipeline k at the time t in unit of °C; $\lambda$ represents a unit conversion factor; $Q_{ps,k,t}^{out}$ represents an outlet heat power of the supply pipeline k at the time t in unit of kW; $T_{ps,k,t}^{out}$ represents an outlet temperature of the supply pipeline k at the time t in unit of °C; $Q_{pr,k,t}^{in}$ represents an inlet heat power of the return pipeline k at the time t in unit of kW; $T_{pr,k,t}^{in}$ represents an inlet temperature of the return pipeline k at the time t in unit of °C; $Q_{pr,k,t}^{out}$ represents an outlet heat power of the return pipeline k at the time t in unit of kW; and $T_{pr,k,t}^{out}$ represents an outlet temperature of the return pipeline k at the time t in unit of °C;

step 1014: establishing a temperature fusion equation: according to the first law of thermodynamics, if the water flow of each pipeline ended at the node i forms a stable temperature field after fusion at the node i, then inlet temperatures of the pipelines started at the node i are all equal and equal to a node temperature, as shown in Equations (8) to (11):

$$\sum_{k \in S_{ps,i}^e} T_{ps,k,t}^{out} \cdot q_{ps,k,t} = T_{ns,i,t} \cdot \sum_{k \in S_{ps,i}^e} q_{ps,k,t} \quad \text{Equation (8)}$$

$$\forall\, i \in S_{ns}, t \in S_t$$

$$\sum_{k \in S_{pr,i}^e} T_{pr,k,t}^{out} \cdot q_{pr,k,t} = T_{nr,i,t} \cdot \sum_{k \in S_{pr,i}^e} q_{pr,k,t} \quad \text{Equation (9)}$$

$$\forall\, i \in S_{nr}, t \in S_t$$

$$T_{ns,i,t} = T_{ps,k,t}^{in} \quad \forall\, i \in S_{ns}, t \in S_t, k \in S_{ps,i}^s \quad \text{Equation (10)}$$

$$T_{nr,i,t} = T_{pr,k,t}^{in} \quad \forall\, i \in S_{nr}, t \in S_t, k \in S_{pr,i}^s \quad \text{Equation (11)}$$

wherein $T_{ns,i,t}$ represents a temperature of the node i of the supply pipeline at the time t in unit of °C; and $T_{nr,i,t}$ represents a temperature of the node i of the return pipeline at the time t in unit of °C; and step 1015: establishing a district heating network transmission delay equation:

calculating a water flow rate of hot water in the pipeline, as shown in Equations (12) and (13):

$$v_{ps,k,t} = \frac{q_{ps,k,t}}{\rho \pi (d_k/2)^2} / \lambda \quad \forall\, k \in S_{ps}, t \in S_t \quad \text{Equation (12)}$$

$$v_{pr,k,t} = \frac{q_{pr,k,t}}{\rho \pi (d_k/2)^2} / \lambda \quad \forall\, k \in S_{pr}, t \in S_t \quad \text{Equation (13)}$$

wherein $v_{ps,k,t}$ represents a water flow rate of hot water in the supply pipeline k at the time t in unit of m/s; $\rho$ represents a density of hot water; $d_k$ represents an inner diameter of the pipeline k in unit of m; and $v_{pr,k,t}$ represents a water flow rate of hot water in the return pipeline k at the time t in unit of m/s;

constraint conditions of the water flow rate of the hot water satisfying Equations (14) and (15):

$$v_{ps,k,t}^{min} \leq v_{ps,k,t} \leq v_{ps,k,t}^{max} \forall\, k \in S_{ps}, t \in S_t \quad \text{Equation (14)}$$

$$v_{pr,k,t}^{min} \leq v_{pr,k,t} \leq v_{pr,k,t}^{max} \forall\, k \in S_{pr}, t \in S_t \quad \text{Equation (15)}$$

wherein $v_{ps,k,t}^{min}$ represents a lower limit of the water flow rate of the hot water in the supply pipeline k at the time t in unit of m/s; $v_{ps,k,t}$ represents the water flow rate of the hot water in the supply pipeline k at the time t in unit of m/s; $v_{ps,k,t}^{max}$ represents an upper limit of the water flow rate of the hot water in the supply pipeline k at the time t in unit of m/s; $v_{pr,k,t}^{min}$ represents a lower limit of the water flow rate of the hot water in the return pipeline k at the time t in unit of m/s; $v_{pr,k,t}$ represents the water flow rate of the hot water in the return pipeline k at the time t in unit of m/s; and $v_{pr,k,t}^{max}$ represents an upper limit of the water flow rate of the hot water in the return pipeline k at the time t in unit of m/s;

calculating a transmission time of hot water in the pipeline, as shown in Equations (16) and (17):

$$\tau_{ps,k,t} = \sum_{j \in S_{ps,k}} \frac{l_j}{v_{ps,j,t}} / \lambda \quad \forall\, k \in S_{ps}, t \in S_t \quad \text{Equation (16)}$$

-continued $$\tau_{pr,k,t} = \sum_{j \in S_{pr,k}} \frac{l_j}{v_{pr,j,t}} \Big/ \lambda \quad \forall k \in S_{pr}, t \in S_t \quad \text{Equation (17)}$$

wherein $\tau_{ps,k,t}$ represents a transmission time of the supply pipeline k at the time t in unit of h; $l_j$ represents a length of a pipeline j in unit of m; $v_{ps,j,t}$ represents a water flow rate of hot water in a supply pipeline j at the time t in unit of m/s; $S_{ps,k}$ represents a set of pipelines of hot water flowing from a heat source to the supply pipeline k; $\tau_{pr,k,t}$ represents a transmission time of the return pipeline k at the time t in unit of h; $S_{pr,k}$ represents a set of pipelines of hot water flowing from the heat source to the return pipeline k; and $v_{pr,j,t}$ represents a water flow rate of hot water in a return pipeline j at the time t in unit of m/s;

rounding actual transmission times calculated by Equations (16) and (17), as shown in Equations (18) and (19):

$$\tau_{ps,k,t}^{sp} = \text{round}(\tau_{ps,k,t}/\Delta t) \forall k \in S_{ps}, t \in S_t \quad \text{Equation (18)}$$

$$\tau_{pr,k,t}^{sp} = \text{round}(\tau_{pr,k,t}/\Delta t) \forall k \in S_{pr}, t \in S_t \quad \text{Equation (19)}$$

wherein $\tau_{ps,k,t}^{sp}$ represents a transmission period of the supply pipeline k at the time t in unit of h; $\tau_{pr,k,t}^{sp}$ represents a transmission time period of the return pipeline k at the time t in unit of h; and $\Delta t$ represents a scheduling time scale in unit of h;

after considering a transmission delay and a transmission heat loss of the heating network, inlet and outlet temperatures of the pipeline satisfying constraints shown in Equations (20) and (21):

$$Q_{ps,k_1,t}^{in} - Q_{ps,k_2,t+\tau_{ps,k_2,t}^{sp}}^{out} = \left(1 - \mu_{hm} \sum_{j \in S_{ps,k_2}} l_j\right) \cdot Q_{ps,k_1,t}^{in} \quad \text{Equation (20)}$$

$$\forall t \in S_t, k_1 \in S_{ps,hs}, k_2 \in S_{ps}$$

$$Q_{pr,k_1,t}^{in} - Q_{pr,k_2,t+\tau_{pr,k_2,t}^{sp}}^{out} = \left(1 - \mu_{hm} \sum_{j \in S_{pr,k_2}} l_j\right) \cdot Q_{pr,k_1,t}^{in} \quad \text{Equation (21)}$$

$$\forall t \in S_t, k_1 \in S_{pr,m}, k_2 \in S_{pr}$$

wherein $Q_{ps,k_1,t}^{in}$ represents an inlet heat power of a supply pipeline $k_1$ at the time t in unit of kW;

$$Q_{ps,k_2,t+\tau_{ps,k_2,t}^{sp}}^{out}$$

represents an outlet heat power of a supply pipeline $k_2$ at a time $t+\tau_{ps,k_2,t}^{sp}$ in unit of kW; $\mu_{hm}$ represents a heat loss rate of the heating network; $S_{ps,k_2}$ represents a set of pipelines between the heat source and the supply pipeline $k_2$; $S_{ps,hs}$ represents a set of supply pipelines connected with the heat source; $Q_{pr,k_1,t}$ represents an inlet heat power of a return pipeline $k_1$ at the time t in unit of kW;

$$Q_{pr,k_2,t+\tau_{pr,k_2,t}^{sp}}^{out}$$

represents an outlet heat power of a return pipeline $k_2$ at a time $t+\tau_{ps,k_2,t}^{sp}$ in unit of kW; $S_{pr,k_2}$ represents a set of pipelines between the heat source and the return pipeline $k_2$;

$S_{pr,m}$ represents a set of return pipelines connected with a heat exchanger m; $\tau_{ps,k_2,2}^{sp}$ represents a delay period of hot water flowing from the heat source to the supply pipeline $k_2$ at the time t; $\tau_{pr,k_2,t}^{sp}$ represents a delay period of hot water flowing from the return pipeline $k_2$ to the heat source at the time t; and $l_j$ represents a length of the pipeline j in unit of m; and step 102: establishing a heat exchanger model:

in the heating network, coupling the heat source with a primary heat supply network by a primary heat exchanger, the model being shown in Equations (22) and (23):

$$Q_{ps,k_1,t}^{in} - Q_{pr,k_2,t}^{out} = \eta_{ex,1} \cdot (Q_{gt,t} + Q_{gb,t}) \forall t \in S_t, k_1 \in S_{ps,hs}, k_2 \in S_{pr,hs} \quad \text{Equation (22)}$$

$$q_{ps,k_1,t} = q_{pr,k_2,t} \forall t \in S_t, k_1 \in S_{ps,hs}, k_2 \in S_{pr,hs} \quad \text{Equation (23)}$$

wherein $Q_{ps,k_1,t}^{in}$ represents the inlet heat power of the supply pipeline $k_1$ at the t in unit of kW; $Q_{pr,k_2,t}^{in}$ represents the outlet heat power of the return pipeline $k_2$ at the time t in unit of kW; $Q_{gt,t}$ represents heat output of the gas tribute at the time t in unit of kW; $Q_{gb,t}$ represents heat output of the gas boiler at the time t in unit of kW; $\eta_{ex,1}$ represents a heat exchange efficiency of the primary heat exchanger; $q_{ps,k_1,t}$ represents a water flow of hot water in a supply pipeline $k_1$ at the time t in unit of kg/h; $q_{pr,k_2,t}$ represents a water flow of hot water in a return pipeline $k_2$ at the time t in unit of kg/h; and $S_{pr,hs}$ represents a set of return pipelines connected with the heat source;

coupling the primary heat supply network with a secondary heat supply network by a secondary heat exchanger, the model being shown in Equations (24) and (25):

$$Q_{ps,k_1,t}^{out} - Q_{pr,k_2,t}^{in} = \sum_{n \in S_{ra,m}} Q_{ra,n,t}/\eta_{ex,2} \quad \text{Equation (24)}$$

$$\forall t \in S_t, k_1 \in S_{ps,m}, k_2 \in S_{pr,m}$$

$$q_{ps,k_1,t} = q_{pr,k_2,t} \quad \forall t \in S_t, k_1 \in S_{ps,m}, k_2 \in S_{pr,m} \quad \text{Equation (25)}$$

wherein $Q_{ps,k_1,t}^{out}$ represents the inlet heat power of the supply pipeline $k_1$ at the time t in unit of kW; $Q_{pr,k_2,t}^{in}$ represents the outlet heat power of the return pipeline $k_2$ at the time t in unit of kW; $Q_{ra,n,t}$ represents a heat dissipation power of a user radiator n at the time t in unit of kW; $\eta_{ex,2}$ represents a heat exchange efficiency of the secondary heat exchanger; $S_{ps,m}$ represents a set of supply pipelines connected with a secondary heat exchanger m; and $S_{pr,m}$ represents a set of return pipelines connected with the secondary heat exchanger m.

2. The integrated energy system operational optimization method considering thermal inertia of district heating networks and buildings according to claim 1, wherein $\Delta t=0.5$ h, $\lambda=3600$, C=4.168 kJ/(kg·° C.), and $\rho=960$ kg/m³.

3. The integrated energy system operational optimization method considering thermal inertia of district heating networks and buildings according to claim 1, wherein the establishing a building model in the step 10 comprises:

step 111: establishing an indoor temperature change model, as shown in Equations (26) and (27):

$$\begin{cases} T_{n,t+1}^{in} = (T_{n,t}^{out} + Q_{ra,n,t}/\eta_{air}) \cdot (1 - e^{-\Delta t/T_c}) + T_{n,t}^{in} \cdot e^{-\Delta t/T_c} & U_{she,m,t}=1 \\ T_{n,t+1}^{in} = T_{n,t}^{out} \cdot (1 - e^{-\Delta t/T_c}) + T_{n,t}^{in} \cdot e^{-\Delta t/T_c} & U_{she,m,t}=0 \end{cases}$$ Equation (26)

$$T_t^{min} \le T_{n,t}^{in} \le T_t^{max}$$ Equation (27)

wherein $T_{n,t+1}^{in}$ represents an indoor temperature of a building n at a time t+1 in unit of °C.; $T_{n,t}^{out}$ represents an outdoor temperature of the building n at a time t in unit of °C.; $\eta_{air}$ represents a thermal conductivity of air in unit of kW/°C.; $T_c$ represents a scheduling period; $T_{n,t}^{in}$ represents an indoor temperature of the building n at the time t in unit of °C.; $U_{she,m,t}$ represents a switching state of a secondary heat exchanger m at the time t, i.e., $U_{she,m,t}=1$ represents that the secondary heat exchanger m is switched on at the time t, and $U_{she,m,t}=0$ represents that the secondary heat exchanger m is switched off at the time t; $T_t^{min}$ represents a lower limit of an indoor temperature at the time t in unit of °C.; and $T_t^{max}$ represents an upper limit of the indoor temperature at the time t in unit of °C.; and step 112: calculating a heat supply index, as shown in Equations (28) and (29):

$$Q_{res,n,t}^d = K_n^a \cdot A_n \cdot 10^{-3}$$ Equation (28)

$$\sum_t Q_{ra,n,t} = \sum_t Q_{res,n,t}^d$$ Equation (29)

wherein $Q_{res,n,t}^d$ represents a design heat load of the building n at the time t in unit of kW; $K_n^a$ represents an area thermal index of the building n in unit of W/m²; and $A_n$ represents an area of the building n in unit of m².

4. The integrated energy system operational optimization method considering thermal inertia of district heating networks and buildings according to claim 1, wherein the step 20 comprises:

step 201: establishing an objective function, as shown in Equation (30):

$$\min C_{total} = C_e + C_g + C_{om} + C_{wt}$$ Equation (30)

$$C_e = \sum_t (K_{gd,e,t} \cdot P_{gd,t} + K_{wt,e,t} \cdot P_{wt,t}) \cdot \Delta t$$

$$C_g = \sum_t \frac{K_g}{H_{ng}} \cdot (Q_{gb,t}/\eta_{gb,h} + P_{gt,t}/\eta_{gt,e}) \cdot \Delta t$$

$$C_{om} = \sum_t (K_{gt,om} \cdot P_{gt,t} + K_{gb,om} \cdot Q_{gb,t}) \cdot \Delta t$$

$$C_{wt} = \sum_t \delta \cdot (P_{wt,t}^{pre} - P_{wt,t}) \cdot \Delta t$$

wherein $C_{total}$ represents a total cost for daily operation in unit of ¥; $C_e$ represents an electricity purchasing cost for daily operation in unit of ¥; $C_g$ represents a gas purchasing cost for daily operation in unit of ¥; $C_{om}$ represents a maintenance cost for daily operation in unit of ¥; $C_{wt}$ represents a wind power abandonment penalty for daily operation in unit of ¥; $P_{gd,t}$ represents an amount of electricity purchased from the power grid at a time t in unit of kW; $K_{gd,e,t}$ represents an electricity price for purchasing electricity from the power grid at the time t in unit of ¥/kWh; $P_{wt,t}$ represents an amount of electricity purchased from the wind power at the time t in unit of kW; $K_{wt,e,t}$ represents an electricity price for purchasing electricity from the wind power at the time t in unit of ¥/kWh; $\eta_{gb,h}$ represents a heating efficiency of the gas boiler; $P_{gt,t}$ represents an output of the gas turbine at the time t in unit of kW; $\eta_{gt,e}$ represents a power generation efficiency of the gas turbine; $K_g$ represents a unit price of gas in unit of ¥/m³; $H_{ng}$ is a heat value of gas in unit of kWh/m³; $K_{gt,om}$ represents an operation and maintenance cost of the gas turbine in unit of ¥/kWh; $K_{gb,om}$ represents an operation and maintenance cost of the gas boiler in unit of ¥/kWh; $\delta$ represents a wind power penalty cost in unit of ¥/kWh; and $P_{wt,t}^{pre}$ represents a predicted wind power output at the time t in unit of kW; and step 202: establishing constraint conditions, which comprises steps 2021 to 2024:

step 2021: establishing an electric power equilibrium constraint, as shown in Equation (31):

$$P_{gt,t} + P_{gd,t} + P_{wt,t} = \sum_{m \in S_{she}} \sum_{n \in S_{ra,m}} P_{n,t}$$ Equation (31)

wherein $S_{she}$ represents a set of secondary heat exchangers; $S_{ra,m}$ represents a set of user radiators connected with a secondary heat exchanger m; and $P_{n,t}$ represents an electrical load of a building n in unit of kW;

step 2022: establishing a gas turbine operation constraint, as shown in Equations (32) to (34):

$$Q_{gt,t} = (1 - \eta_{gt,e} - \eta_{gt,loss})\eta_{hr,h}/\eta_{gt,e} \cdot P_{gt,t}$$ Equation (32)

$$P_{gt,t}^{min} \le P_{gt,t} \le P_{gt,t}^{max}$$ Equation (33)

$$-P_{gt,dw}^{max} \le P_{gt,t} - P_{gt,t-1} \le P_{gt,up}^{max}$$ Equation (34)

wherein $\eta_{gt,loss}$ represents a loss rate of the gas turbine; $\eta_{hr,h}$ represents a recovery efficiency of a heat recover device; $P_{gt,t}^{max}$ represents an upper limit of an operating power of the gas turbine at the time t in unit of kW; $P_{gt,t}^{min}$ represents a lower limit of the operating power of the gas turbine at the time t in unit of kW; $P_{gt,dw}^{max}$ represents an upper limit of a ramping down power of the gas turbine in unit of kW; $P_{gt,up}^{max}$ represents an upper limit of a ramping up power of the gas turbine in unit of kW; and $P_{gt,t-1}$ represents an output of the gas turbine at a time t−1 in unit of kW;

step 2023: establishing a minimum start-stop time constraint: comprising a minimum operation time constraint of the gas turbine shown in Equation (35), a stop time constraint of the gas turbine shown in Equation (36), a minimum operation time constraint of the secondary heat exchanger shown in Equation (37), and a stop time constraint of the secondary heat exchanger shown in Equation (38):

$$\begin{cases} \tau_{gt,t}^{on} = (\tau_{gt,t-1}^{on} + U_{gt,t} \cdot \Delta t) \cdot U_{gt,t} \\ \tau_{gt,t}^{off} = (\tau_{gt,t-1}^{off} + (1 - U_{gt,t}) \cdot \Delta t) \cdot (1 - U_{gt,t}) \end{cases}$$ Equation (35)

-continued $$\begin{cases} \tau_{gt,t}^{on} \geq \tau_{gt}^{on,min} \\ \tau_{gt,t}^{off} \geq \tau_{gt}^{off,min} \end{cases} \quad \text{Equation (36)}$$

$$\begin{cases} \tau_{she,m,t}^{on} = (\tau_{she,m,t-1}^{on} + U_{she,m,t} \cdot \Delta t) \cdot U_{she,m,t} \\ \tau_{she,m,t}^{off} = (\tau_{she,m,t-1}^{off} + (1 - U_{she,m,t}) \cdot \Delta t) \cdot (1 - U_{she,m,t}) \end{cases} \quad \text{Equation (37)}$$

$$\begin{cases} \tau_{she,m,t}^{on} \geq \tau_{she,m}^{on,min} \\ \tau_{she,m,t}^{off} \geq \tau_{she,m}^{off,min} \end{cases} \quad \text{Equation (38)}$$

wherein $\tau_{gt,t}^{on}$ represents a continuous start-up time of the gas turbine at the time t in unit of h; $\tau_{gt,t-1}^{on}$ represents a continuous start-up time of the gas turbine at the time t−1 in unit of h; $U_{gt,t}$ represents an operating state of the gas turbine at the time t, $U_{gt,t}=1$ represents that the gas turbine is operated at the time t, and $U_{gt,t}=0$ represents that the gas turbine is shut down at the time t; $\tau_{gt,t}^{off}$ represents a continuous shutdown time of the gas turbine at the time t in unit of h; $\tau_{gt,t-1}^{off}$ represents a continuous shutdown time of the gas turbine at the time t−1 in unit of h; $\tau_{gt}^{on,min}$ represents a lower limit of the continuous start-up time of the gas turbine in unit of h; $\tau_{gt}^{off,min}$ represents a lower limit of the continuous shutdown time of the gas turbine in unit of h; $\tau_{she,m,t}^{on}$ represents a continuous start-up time of the secondary heat exchanger at the time t in unit of h; $\tau_{she,m,t-1}^{on}$ represents a continuous start-up time of the secondary heat exchanger at the time t−1 in unit of h; $U_{she,m,t}$ represents an on-off state of the secondary heat exchanger m at the time t, $U_{she,m,t}=1$ represents that the secondary heat exchanger m is switched on at the time t, and $U_{she,m,t}=0$ represents that the secondary heat exchanger m is switched off at the time t; $\tau_{she,m,t}^{off}$ represents a continuous stop time of the secondary heat exchanger at the time t in unit of h; $\tau_{she,m,t-1}^{off}$ represents a continuous stop time of the secondary heat exchanger at the time t−1 in unit of h; $\tau_{she,m}^{on,min}$ represents a lower limit of the continuous start-up time of the secondary heat exchanger in unit of h; and $\tau_{she,m}^{off,min}$ represents a lower limit of the continuous stop time of the secondary heat exchanger in unit of h;

step 2024: establishing a tie-line power constraint, as shown in Equation (39):

$$\begin{cases} P_{gd}^{min} \leq P_{gd,t} \leq P_{gd}^{max} \\ 0 \leq P_{wt,t} \leq P_{wt,t}^{pre} \end{cases} \quad \text{Equation (39)}$$

wherein $P_{gd}^{min}$ represents a lower limit of purchasing electricity from the power grid in unit of kW; and $P_{gd}^{max}$ represents an upper limit of purchasing electricity from the power grid in unit of kW.

5. The integrated energy system operational optimization method considering thermal inertia of district heating networks and buildings according to claim 1, wherein in the step 30, heating network parameters are substituted into Equations (12) and (13) to obtain a water flow rate of each pipeline section; the heating network parameters and the obtained water flow rates are substituted into Equations (16) and (17) to obtain a specific delay of each pipeline section; the specific delay is substituted into Equations (18) and (19) to obtain a delay period of each pipeline section; finally, the delay period of each pipeline section, the heating network parameters and system parameters are substituted into an integrated energy system optimization model to obtain the optimal scheduling plan; the outputs of the gas turbine and the gas boiler are controlled according to the optimal scheduling plan, and the electricity is purchased from the power grid and the wind power.

\* \* \* \* \*